Dec. 11, 1956 F. A. MORRIS 2,773,936

AUTOMATIC TELEPHONE SYSTEM

Filed Aug. 10, 1951 11 Sheets-Sheet 1

INVENTOR.
Frank A. Morris
BY T. L. Bowes
Att'y

Dec. 11, 1956 F. A. MORRIS 2,773,936

AUTOMATIC TELEPHONE SYSTEM

Filed Aug. 10, 1951 11 Sheets-Sheet 2

INVENTOR.
Frank A. Morris
BY T. L. Bowes
Att'y

Dec. 11, 1956 F. A. MORRIS 2,773,936

AUTOMATIC TELEPHONE SYSTEM

Filed Aug. 10, 1951 11 Sheets-Sheet 3

INVENTOR.
Frank A. Morris
BY J. L. Barnes
Att'y

AUTOMATIC TELEPHONE SYSTEM

Filed Aug. 10, 1951 11 Sheets-Sheet 4

INVENTOR.
Frank A. Morris
BY T. L. Bowes
Att'y

INVENTOR.
Frank A. Morris
BY T. L. Bowes
Att'y

AUTOMATIC TELEPHONE SYSTEM

Filed Aug. 10, 1951 11 Sheets-Sheet 6

INVENTOR.
Frank A. Morris
BY T. L. Bowes
Att'y

INVENTOR.
Frank A. Morris
BY J. L. Bowes
Att'y

INVENTOR.
Frank A. Morris
BY
T. L. Bowes
Att'y

Dec. 11, 1956 F. A. MORRIS 2,773,936

AUTOMATIC TELEPHONE SYSTEM

Filed Aug. 10, 1951 11 Sheets-Sheet 9

INVENTOR.
Frank A. Morris
BY T. L. Bowes
Att'y

Dec. 11, 1956 F. A. MORRIS 2,773,936

AUTOMATIC TELEPHONE SYSTEM

Filed Aug. 10, 1951 11 Sheets-Sheet 10

INVENTOR.
Frank A. Morris
BY
J. L. Bowes
Att'y

Dec. 11, 1956 F. A. MORRIS 2,773,936

AUTOMATIC TELEPHONE SYSTEM

Filed Aug. 10, 1951 11 Sheets-Sheet 11

INVENTOR.
Frank A. Morris
BY T. L. Bowes
Att'y 2,773,936

AUTOMATIC TELEPHONE SYSTEM

Frank A. Morris, Rochester, N. Y., assignor, by mesne assignments, to General Dynamics Corporation, a corporation of Delaware Application August 10, 1951, Serial No. 241,351

31 Claims. (Cl. 179—15)

Figure 1:
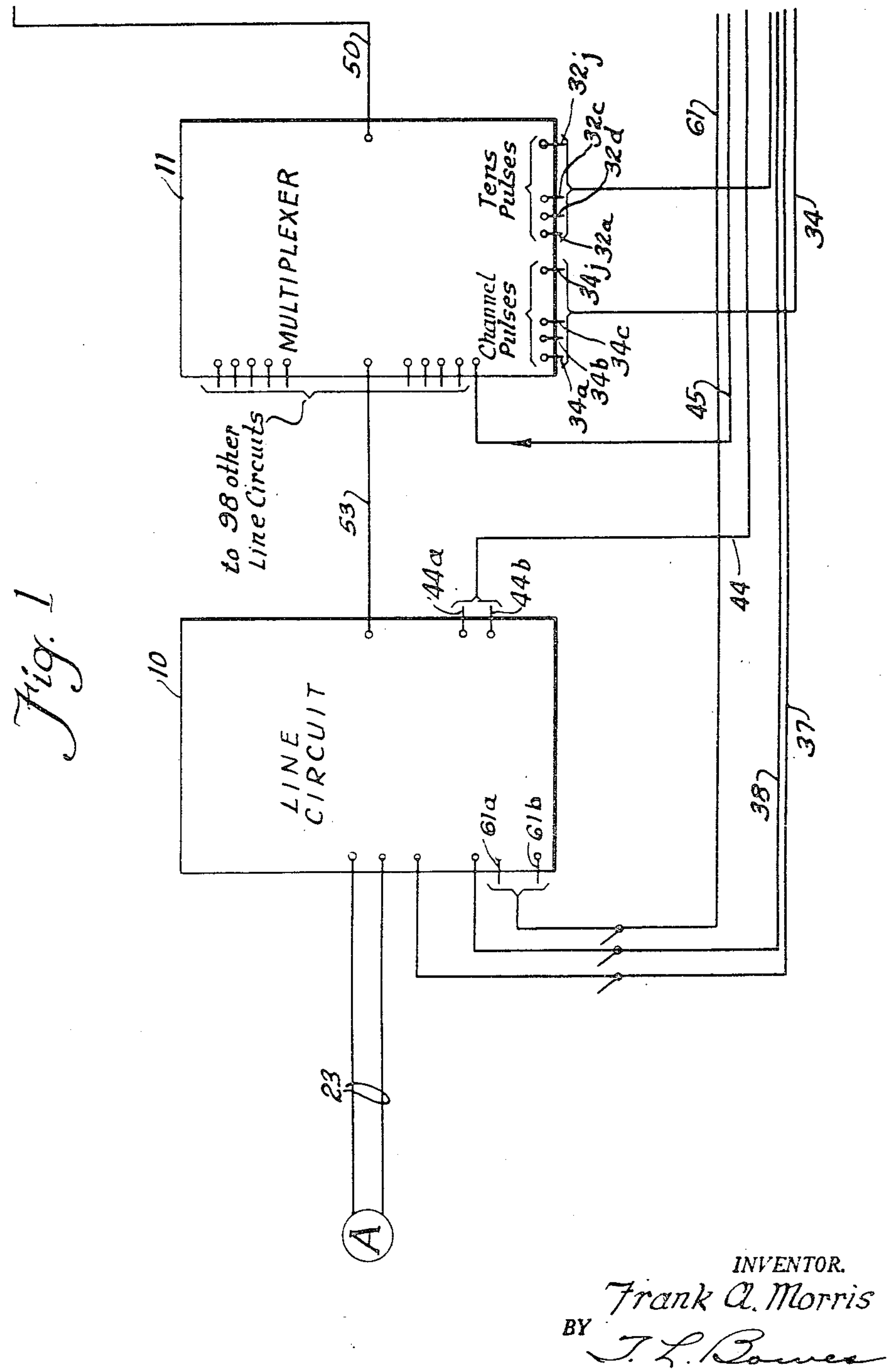

The present invention relates to improved apparatus for setting up private two-way communication connections between the lines of an automatic telephone system, and more particularly to improved apparatus for automatically signaling a calling subscriber when an all-links-busy condition exists at a given switching stage in an automatic telephone system. In particular, this application relates to improvements in the system disclosed and claimed in copending application Serial No. 134,974, filed December 24, 1947, Frank A. Morris and Robert B. Trousdale, and assigned to the same assignee as the present application.

Many types of automatic switching apparatus have been proposed and developed for transmitting signals between the lines of telephone, telegraph and other communication systems. In the main, the apparatus proposed and developed for this purpose utilizes electromechanical devices embodying moving mechanical parts, such, for example, as relays, stepping switches and the like, to perform the line selecting, line interconnecting and ancillary functions required in selectively interconnecting any two lines of a large group of lines. While apparatus of this type and embodying switching devices of various forms has been developed to provide thoroughly reliable service, it is inherently subject to several limitations, including that of insufficient operating speed. To overcome these limitations various proposals have been made for utilizing electronic facilities, such, for example, as cathode ray tubes, for the purpose of transmitting signals between the lines of a signaling system on a selective basis. However, most if not all of these proposals are limited to arrangements for providing one-way signal transmission between two lines.

In the improved system disclosed in the above-identified copending application, a system of multiplexing, namely pulsed sampling effectively at an ultrasonic rate of the control and intelligence signals produced at each substation of the system, is utilized to provide signal channel separation. Specifically, each line or substation of the system is assigned a particular pulse time position in each of repetitive pulse frames each comprising one hundred pulse time positions. Intelligence and control signals developed at any one substation of the system are sampled only in the particular pulse time position assigned to the particular substation and the samples are carried through the signal transmitting linkage of the system as far as the connector stage on multiplexer signal pulses occurring in this particular time position. In the connector stage the control or intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation. While the system is entirely satisfactory in operation, no provisions are made therein for indicating to a calling subscriber that the available linkage is all in use during periods when this condition prevails in the system.

It is an object of the present invention, therefore, to provide new and improved apparatus for automatically signaling the calling subscribers using an automatic telephone system when all of the available linkage at a particular switching stage of the system is in use.

It is another object of the present invention to provide an improved automatic telephone system capable of providing all of the services of electromechanical switch type systems, but which consists exclusively of electron discharge tubes and interconnecting circuit components, and includes facilities for automatically transmitting an all-links-busy signal to calling subscribers who initiate calls during periods when all of the available links at a given switching stage of the system are in use.

It is still another object of the invention to provide all-links-busy signaling facilities for the purpose described which are simple in arrangement, reliable in operation and may be easily and quickly installed.

Figure 2:
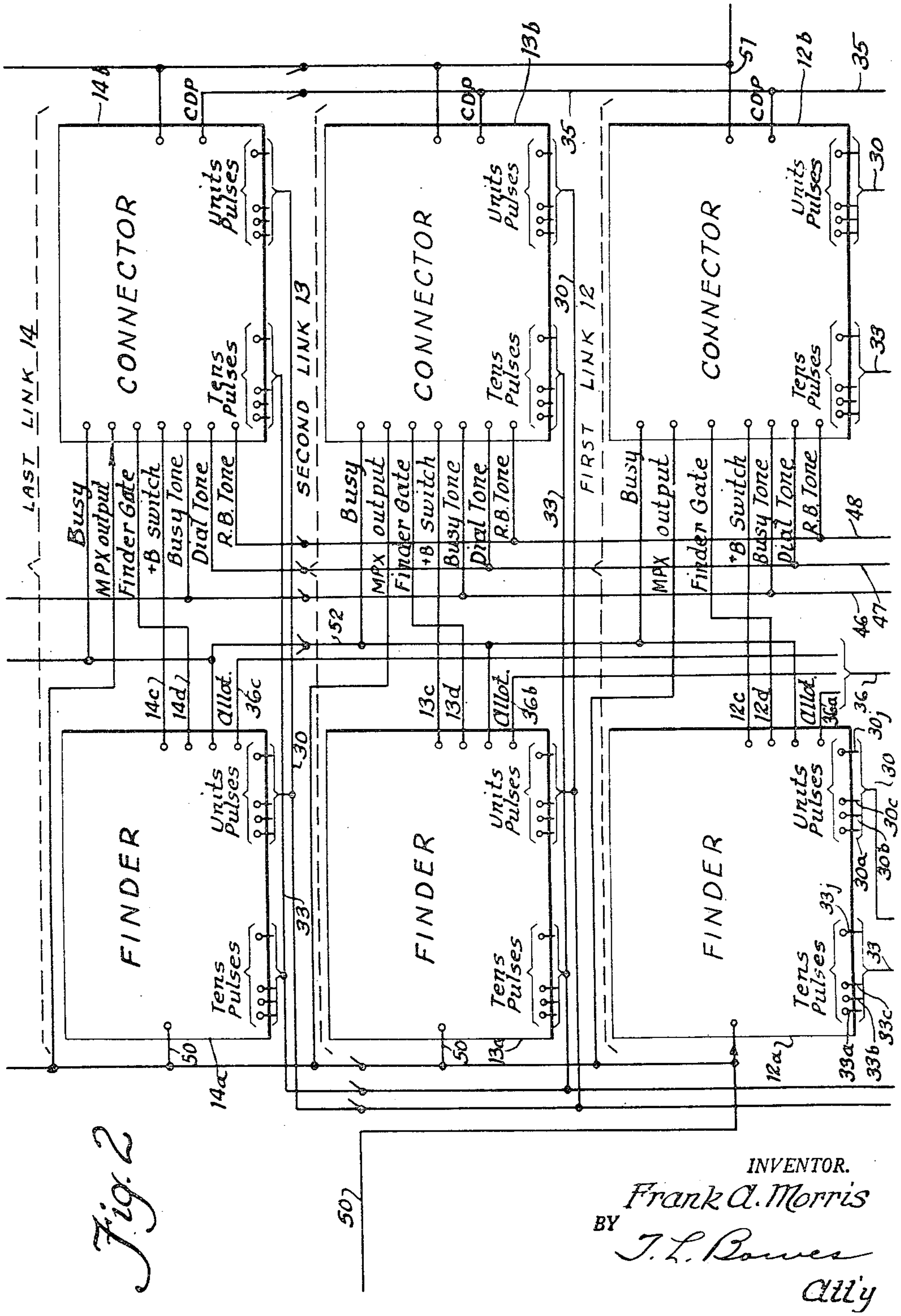
Figure 2A:
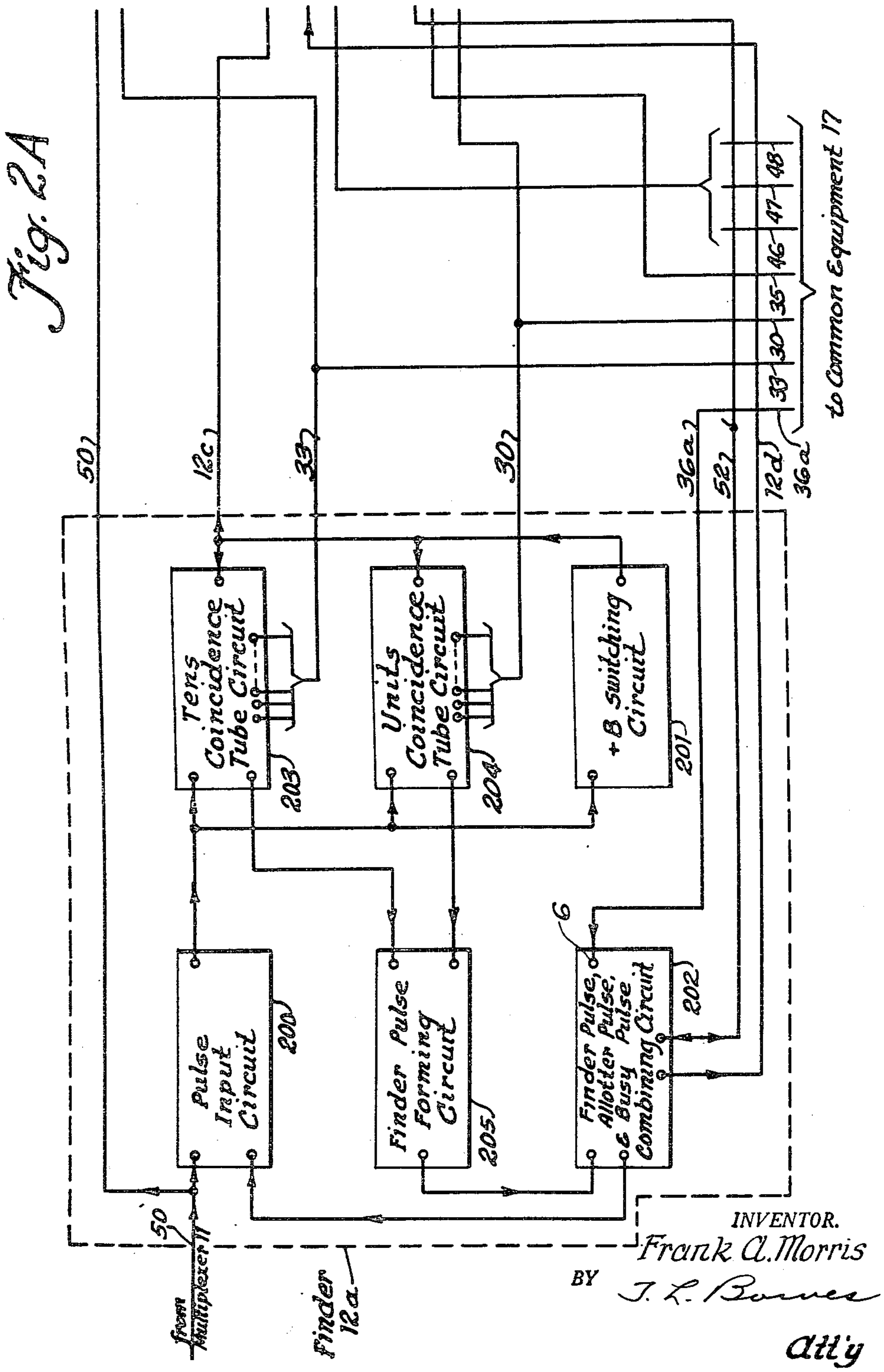
Figure 2B:
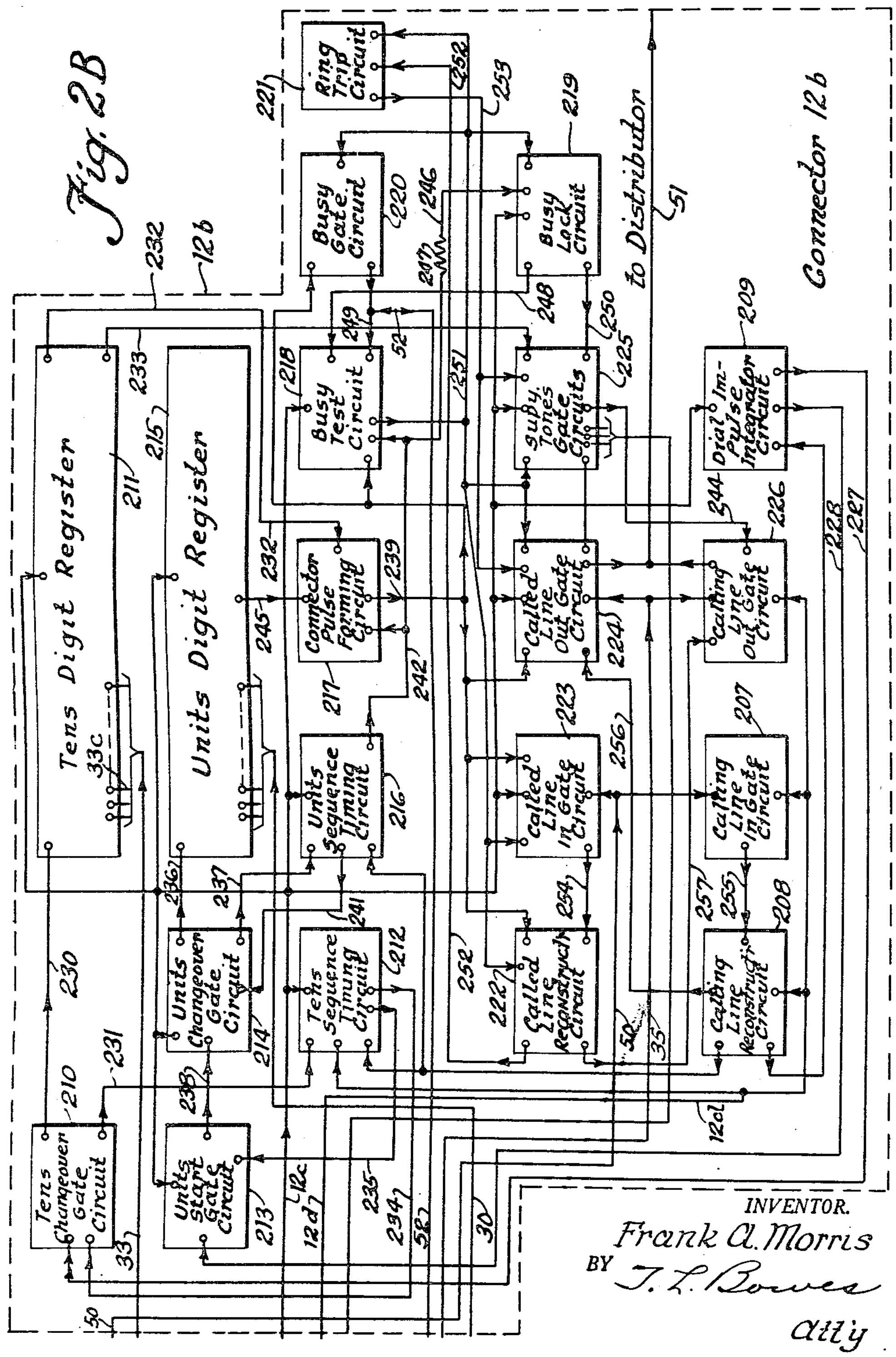
Figure 3:
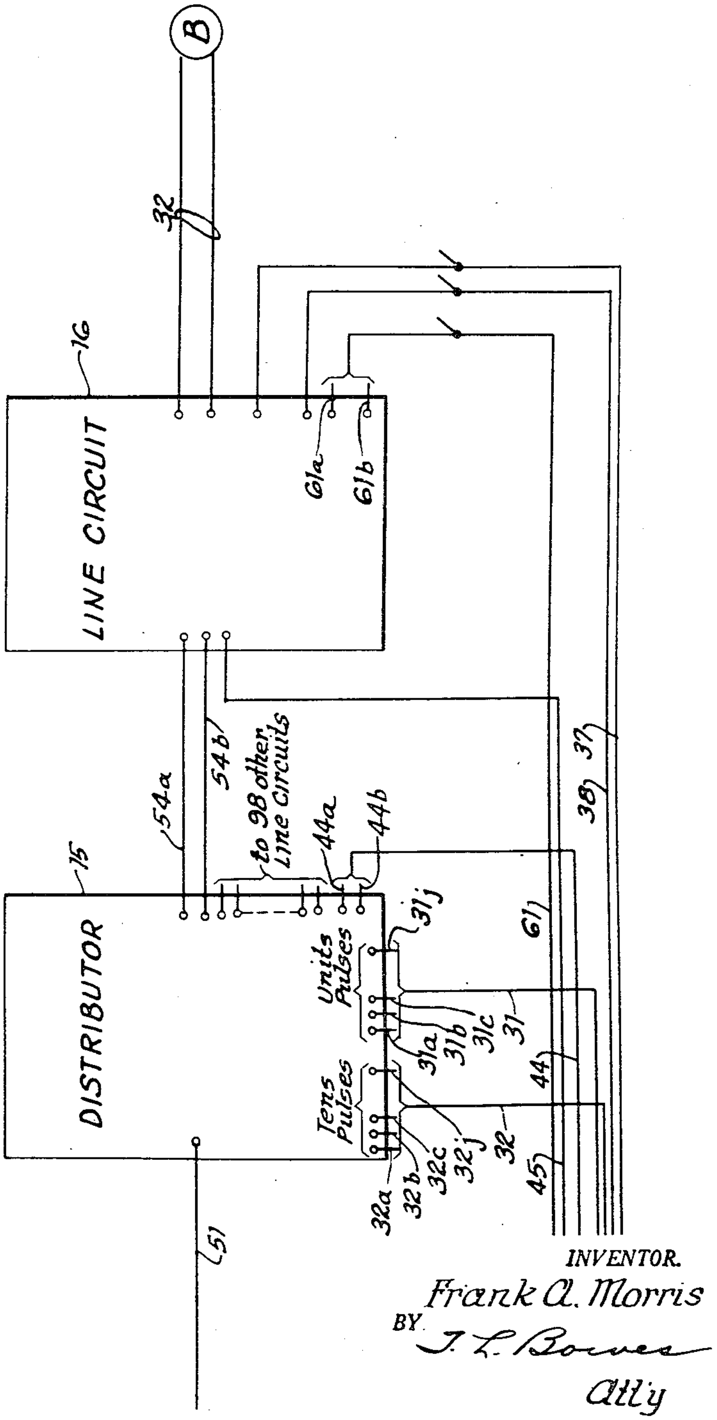

The invention, both as to its organization and method of operation, together with further objects and advantages thereof, will best be understood by reference to the following specification taken in connection with the accompanying drawings, in which:

Figs. 1, 2, 3, 4 and 5 diagrammatically illustrate an automatic telephone system characterized by the features of the present invention;

Figs. 2A and 2B when laid end to end in the order named diagrammatically illustrate the components of one of the finder-connector links embodied in the system shown in Figs. 1 to 4, inclusive, and Figs. 6, 7, 8 and 9 when laid side by side in the order named graphically illustrate the time relationships between certain of the pulses developed by and utilized in the various components of the system.

*General description of the system*

Figure 4:
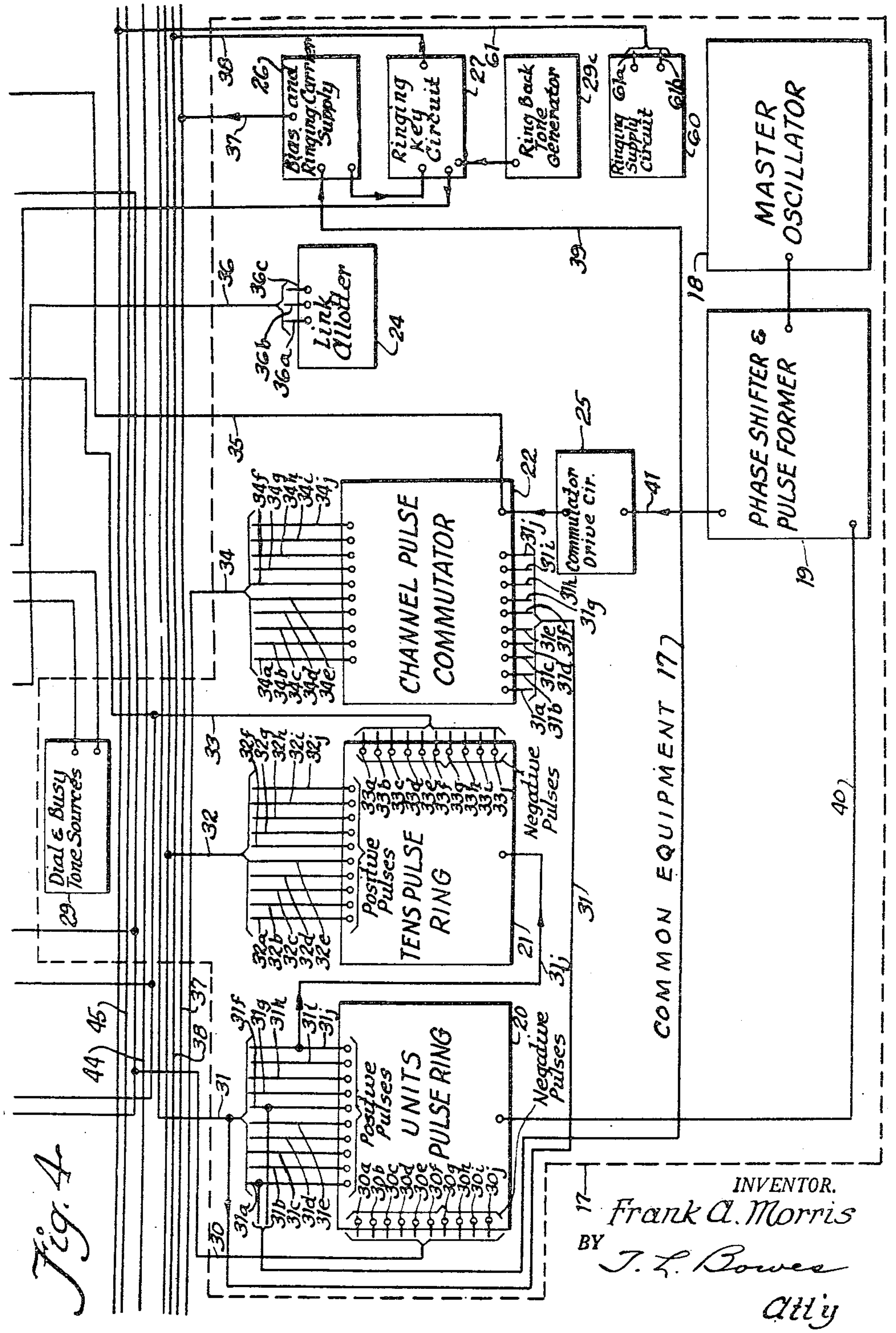
Figure 5:
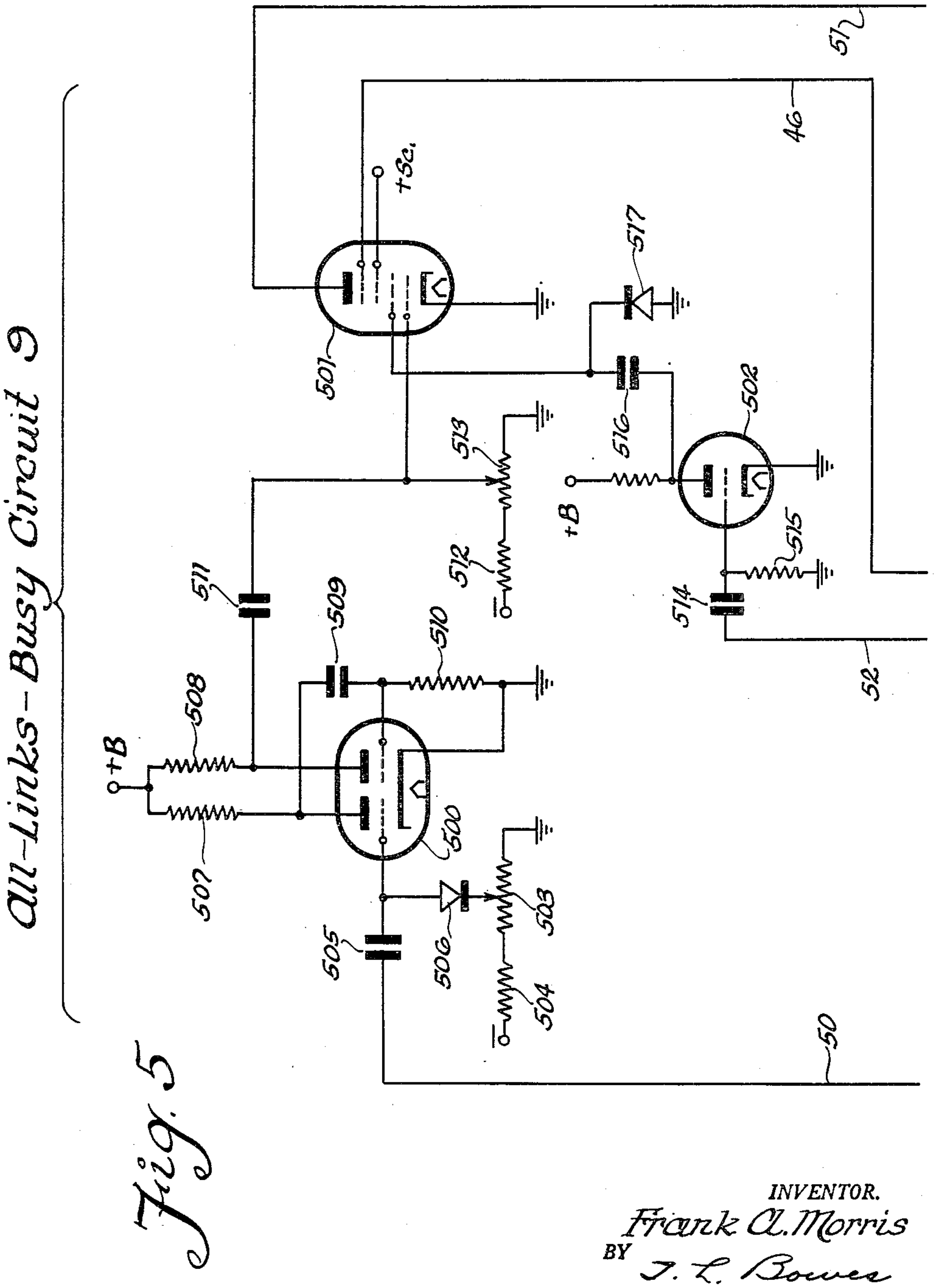
Figure 6:
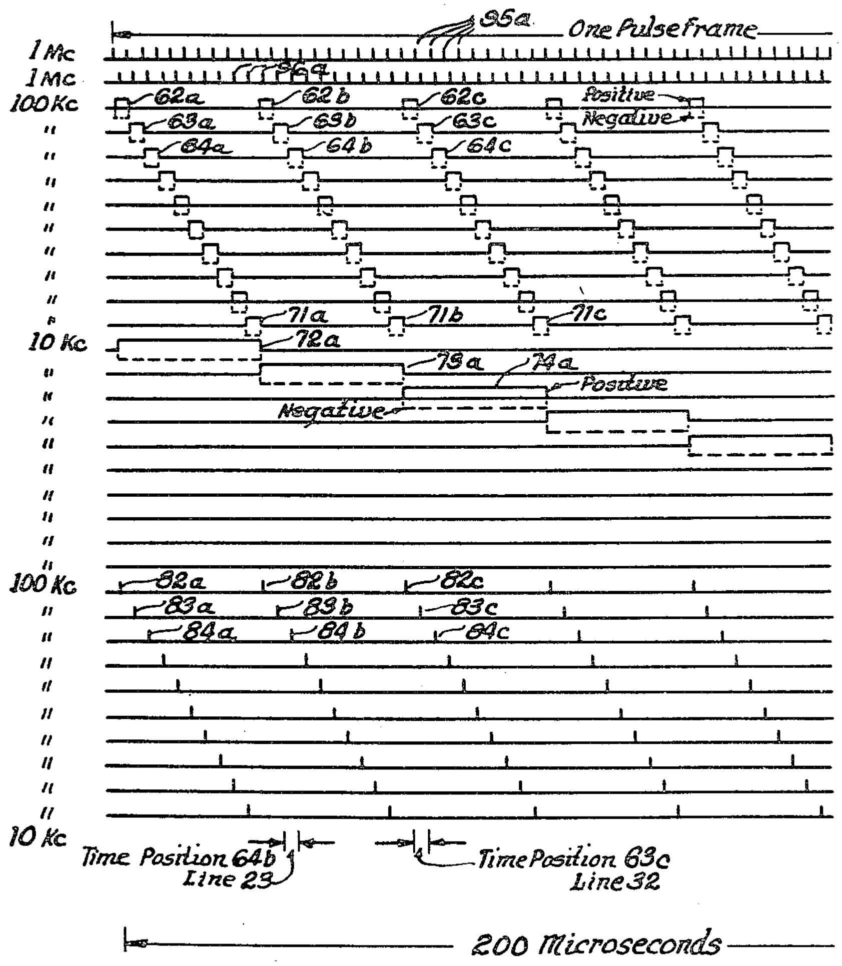
Figure 7:
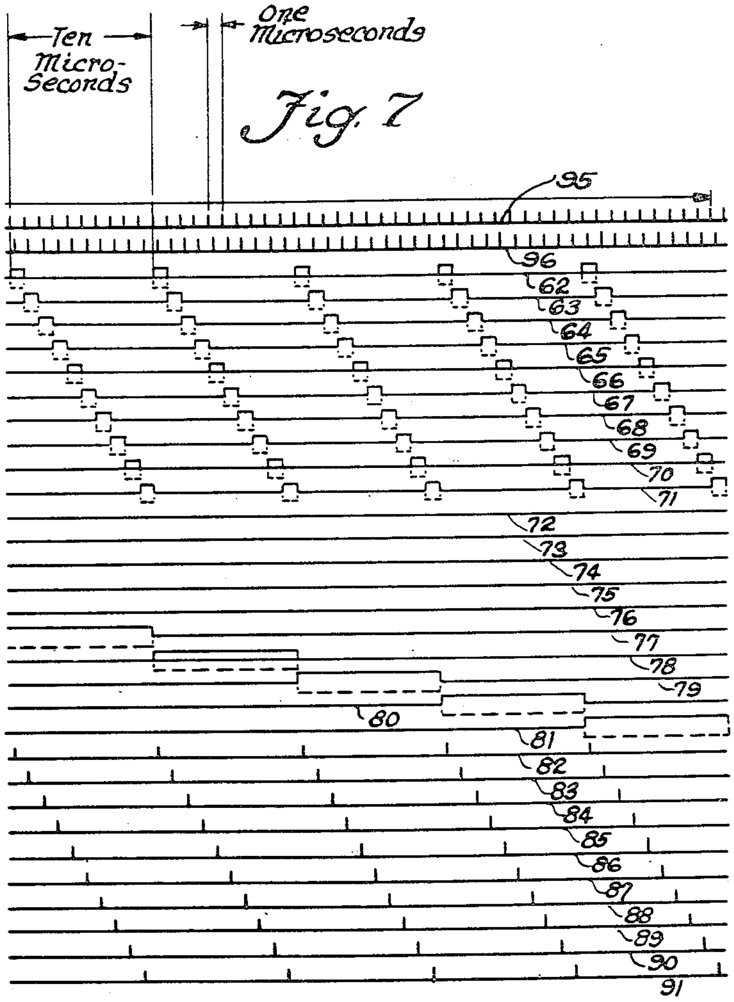
Figure 8:
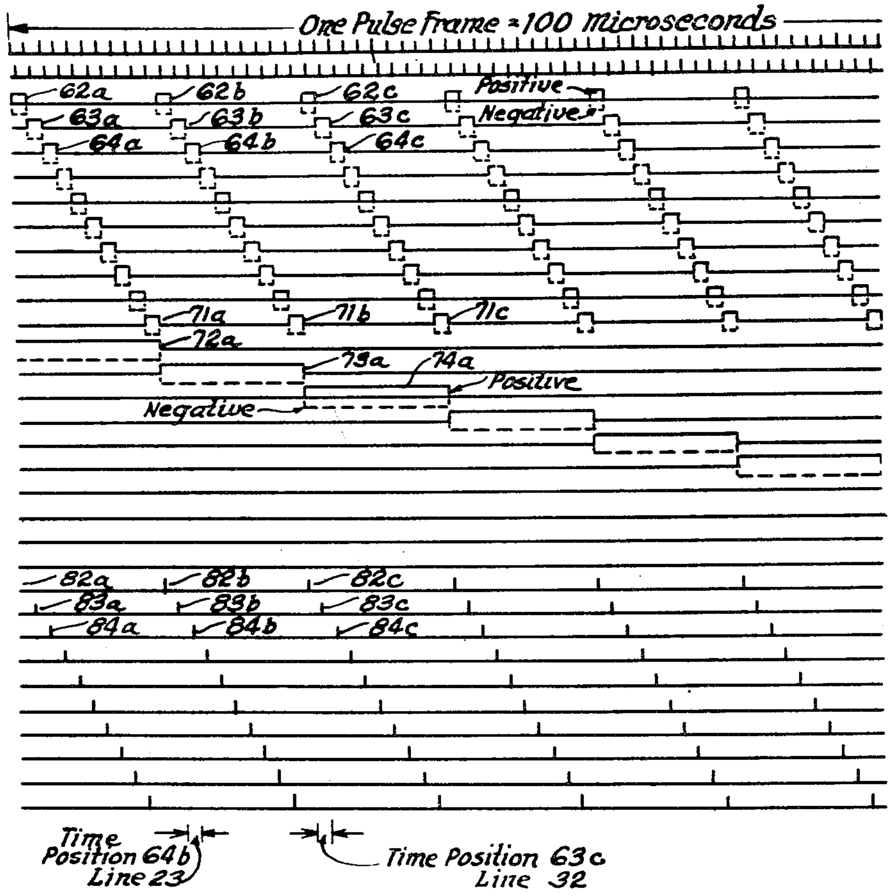
Figure 9:
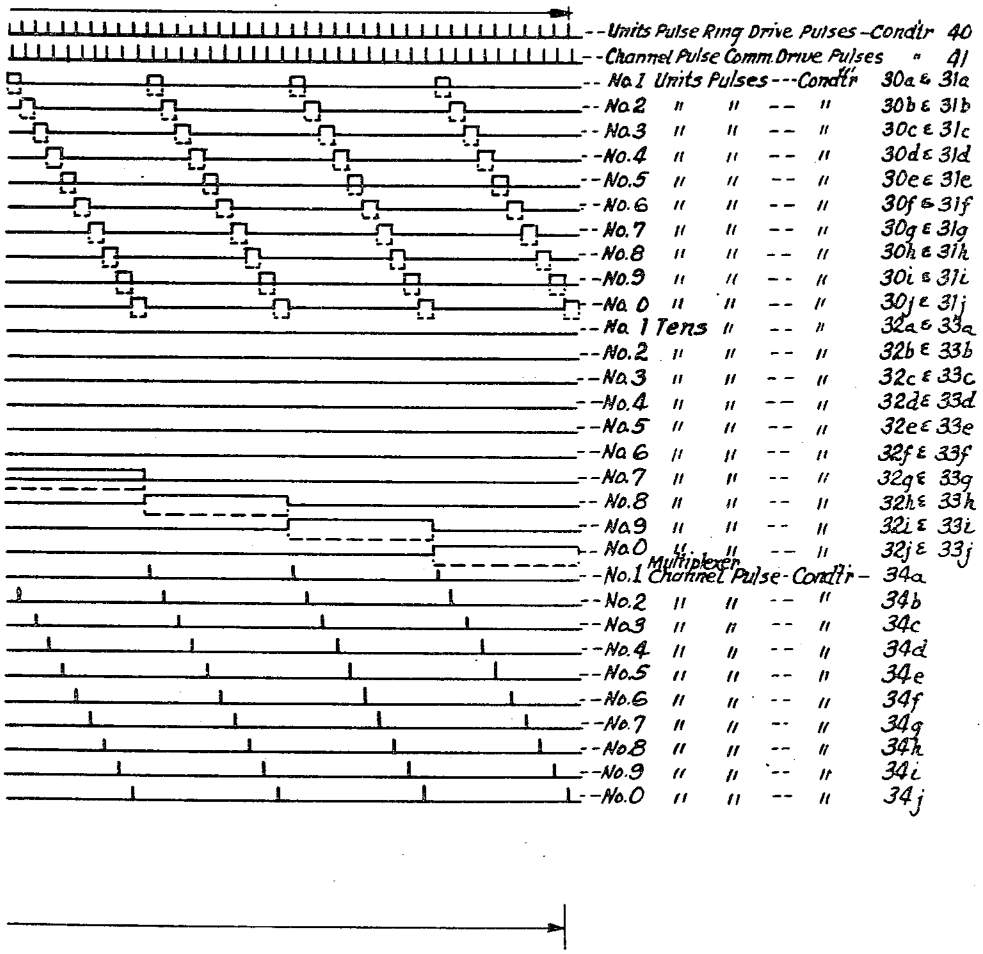

Referring now to the drawings and more particularly to Figs. 1, 2, 3 and 4 thereof, the automatic electronic telephone system as disclosed and claimed in the above-identified copending application is there diagrammatically illustrated as comprising line circuits 10, 16, etc., individual to the one hundred lines of the system, a multiplexer 11 of which only one is required in the system, a plurality of identical finder-connector links 12, 13 and 14, a distributor 15 of which only one is required in the system, the common equipment indicated generally at 17 in Fig. 4 of the drawings, and the all-links-busy circuit indicated generally at 9 in Fig. 5 of the drawings and forming the subject matter of the present invention. Each of the finder-connector links is comprised of a finder and a connector, the illustrated links respectively comprising finders **12*a*, 13*a* and 14*a* and connectors 12*b*, 13*b* and 14*b*. It will be understood that the number of finder-connector links employed in the system may be chosen as required to handle the traffic. Although only three links 12, 13 and 14** have been illustrated, from seven to ten links will normally be required in actual practice to handle the traffic of a one hundred line exchange. Inclusion of the additional links in the system may easily be accomplished by connecting appropriate terminals of additional links to the indicated multiple points.

As shown, the line circuits 10 and 16 respectively terminate two two-conductor lines which are respectively identified by their directory number designations 23 and 32 and extend to the substations A and B, respectively. Each line circuit performs the functions of repeating intelligence or control signals from its associated substation to a corresponding one of the gate circuits in the multiplexer 11, repeating intelligence signals derived from a particular gate circuit of the distributor 15 to its associated substation, and of responding to ring start signals derived from one of the connectors 12b, 13b or 14b by way of the distributor 15 to transmit ringing current to the associated substation on a call incoming thereto. To perform these functions, the line circuit 10 is connected by way of a conductor 53 to one of the gate circuits provided in the multiplexer 11, and is connected by way of the conductors 44a and 44b forming the illustrated cable 44 to one of the gate circuits provided in the distributor 16. The line circuit 10 is also connected to certain components of the common equipment 17 in the manner described below. Similarly, the line circuit 16 is connected by way of the conductors 54a and 54b to one of the gate circuits in the distributor 15 and by way of the conductor 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11 and distributor 15 and on a common basis to certain components of the common equipment 17.

Generally speaking, the multiplexer 11 performs the functions of sampling the intelligence and control signals derived from the one hundred line circuits of the system only in the time positions of each pulse frame individually assigned to the lines served by these line circuits, and of modulating the sampled intelligence or control signals on the multiplexer signal pulses occurring in these time positions for transmission to the finders and connectors of the plurality of links 12, 13 and 14. To this end, the output terminals of the multiplexer 11 are connected by way of the common conductor 50 to the multiplexer input terminals of each of the finders 12a, 13a and 14a and also to the multiplexer input terminals of each of the connectors 12b, 13b and 14b. In reverse manner, the distributor 15 performs the function of repeating intelligence and control signals derived from the connectors 12b, 13b and 14b in time positions corresponding to particular calling and called lines to the line circuits respectively terminating the lines. To this end, the input terminals of the distributor are connected by way of the common conductor 51 to the output terminals of each of the connectors 12b, 13b and 14b. In performing the described functions, the multiplexer 11 and the distributor 15 are controlled by certain components of the common equipment 17 in the manner hereinafter explained.

The finders of the various links, such, for example, as the finder 12a, do not perform any intelligence transmission functions. On the contrary, they function strictly as control units. Specifically, the finder 12a is provided to perform the funciton of determining when the link 12 shall be taken into use, determining the calling line with which the link is to be associated in handling a call, and determining the particular time position of successive pulse frames which is assigned to the calling line and during which signal bearing pulses derived from the multiplexer 11 shall be effective to produce a response in the finder and in the associated connector 12b. To advise the connector of the time position assigned to the calling line, the finder 12a transmits finder gate pulses to the connector in this time position over the conductor 12d. The finder 12a also performs the function of conditioning its associated connector 12b for operation when the link 12 is definitely associated with a calling line to handle the call initiated on the line. This is accomplished through operation of the finder 12a to impress operating anode potentials upon a plurality of the tubes in the connector 12b over the +B switch conductor 12c. When operatively associated with a particular calling line, the finder 12a also performs the function of guarding the calling line against intrusion of an incoming call to the line. This is accomplished through operation of the finder 12a to feed busy pulses occurring in the particular time position assigned to the calling line with which the finder is operatively associated to a common busy conductor 52 which is multipled to each of the finders and connectors of the system. To perform the above functions in the manner fully explained below, the finder 12a comprises (see Fig. 2A) a pulse input circuit 200, a +B switching circuit 201, a pulse combining circuit 202, tens and units coincidence tube circuits 203 and 204, and a finder pulse forming circuit 205. It will be noted that the finder 12a and connector 12b are connected on an individual link basis by only two conductors, namely the +B switch conductor 12c and the finder gate pulse conductor 12d. The finder 13a and connector 13b of the link 13 are similarly connected on an individual link basis by means of the finder gate and +B switch conductors 13d and 13c which respectively correspond to the conductors 12d and 12c of the link 12. Similarly, the finder gate and +B switch conductors 14d and 14c are provided to connect the finder 14a and connector 14b of the link 14.

Each of the connectors 12b, 13b and 14b performs a plurality of different functions. Thus the connector 12b, for example, is controlled by finder gate pulses delivered thereto over the conductor 12d to accept and respond to signal bearing multiplexer pulses occurring in the time position corresponding to the calling line with which the link is associated. It also responds to the application of operating anode potential to the conductor 12c and to the finder gate pulses appearing on the conductor 12d to feed a dial tone signal to the distributor 15 on connector signal pulses occurring in the time position assigned to the calling line with which it is operatively associated, thereby to return the usual dial tone signal to the calling subscriber. This connector 12b also responds to dial pulses (two digits) originating at the calling line with which the link 12 is operatively associated to select the particular time position assigned to the called line. Incident to the selection of this time position, the connector 12b conditions itself to accept signal carrying pulses from the multiplexer 11 which occur in the time position corresponding to the selected called line, to store the intelligence carried by these pulses, and to retransmit the intelligence to the distributor 15 on connector signal pulses occurring in the time position corresponding to the calling line with which the link 12 is operatively associated. In effect, therefore, the connector functions to shift signal carrying pulses from the time position assigned to the calling line to the time position assigned to the called line, and also to shift return signal pulses carrying intelligence derived from the called line from the particular time position assigned to the called line to the particular time position corresponding to the calling line. In addition, the connector 12b performs the auxiliary functions of terminating dial tone transmission to the calling substation when the first line selecting impulse is dialed into the connector; feeding busy pulses to the busy conductr 52 in the time position assigned to the called line, thereby to guard the called line against seizure through another link; testing the time position assigned to the called line to determine the idle or busy condition of that line; transmitting busy tone carrying pulses to the distributor 15 in the time position assigned to the calling line in the event the called line tests busy; transmitting a ring start signal by way of the distributor 15 to the line circuit terminating the called line in the event the called line tests idle, concurrently transmitting ring-back tone modulated pulses to the distributor 15 in the time position assigned to the calling line, thereby to signal the calling subscriber that the called substation is being rung; and terminating the ring start signal and concurrently termianting ring-back tone signal transmission to the calling substation in response to answering of the call at the called substation. The connector 12b is also arranged to release in response to the release of a connection involving the link 12 at the calling substation.

To perform the above-mentioned functions in the manner fully explained below, the connector 12*b*, as diagrammatically illustrated in Fig. 2B, is provided with a calling line in gate circuit 207 which responds to finder gate pulses transmitted to the connector over the conductor 12*d* to repeat signal bearing pulses delivered thereto from the multiplexer 11 in the time position assigned to the calling line, and a calling line reconstructor circuit 208 having the function of detecting or reconstructing and storing the intelligence carried by the signal bearing pulses transmitted to the connector from the multiplexer 11 in the time position assigned to the calling line. The connector 12*b* further comprises a called line out gate circuit 224 for gating to the distributor 15 connector signal pulses carrying the intelligence reconstructed by the circuit 208 in the time position assigned to a particular called line. In addition, the connector 12*b* includes a called line in gate circuit 223 for repeating multiplexer pulses in the time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12*d* to gate to the distributor 15 signal bearing connector pulses which occur in the time position assigned to the calling line. More generally, the three circuits 207, 208 and 224 function to repeat intelligence from the calling line to the called line, whereas the three corresponding circuits 223, 222 and 226 function to repeat to the calling line intelligence derived from the called line.

The connector 12*b* additionally comprises a plurality of components for responding to two digits of dial pulses repeated to the connector on multiplexer pulses occurring in the time position assigned to the calling line. In general the dial pulse responsive equipment of the connector 12*b* comprises a dial impulse integrator circuit 209 which receives dial impulses from the reconstructor circuit 208, a tens changeover gate circuit 210, a units start gate circuit 213 to which pulses are repeated by the dial pulse integrator circuit 209, tens and units digit registers 211 and 215 which are respectively controlled in accordance with numerical values of the tens and units digits repeated to the circuits 210 and 213 from the integrator circuit 209, a units changeover gate circuit 214 interposed between the start gate circuit 213 and the units digit register 215, and tens and units sequence timing circuits 212 and 216 which in effect function as the digit counting components of the connector, i. e., initiate certain operations at the ends of the first and second digits dialed into the connector. The connector further comprises a connector pulse forming circuit 217 which is controlled in accordance with the settings imparted to the tens and units digit registers 211 and 215 at the end of the dialing operation to produce the connector pulses which are employed to control the circuits 222, 223 and 224 in the transmission of intelligence and control signal information from the connector to the distributor 15 in the time position assigned to the called line. The busy test facilities of the connector comprise a busy test circuit 218 jointly controlled by the connector pulse forming circuit 217 and busy pulses transmitted to the connector over the common busy lead 52, a busy lock circuit 219 and a busy gate circuit 220. In addition, the connector comprises supervisory tone gate circuits 225 having the function of gating dial, busy and ring-back tones to the calling line. Finally, the connector comprises a ring trip circuit 221 which is assigned the function of terminating ringing current transmission to a called substation when a call answering operation is performed at the substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 functions continuously to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network. As controlled by the phase shifter and pulse former network 19, the units pulse ring circuit 20 functions sequentially to develop the units pulses which define the time positions of the pulse or time position frames, appear on the conductors within the cables 31 and 30, respectively, and are fed by way of these conductors to the various intelligence transmitting and control components of the system. More specifically, the cable 30 comprises ten units pulse conductors 30*a*, 30*b*–30*j* over which negative units pulses are sequentially transmitted in the order named to the units coincidence tube circuits 204 of the finders 12*a*, 13*a* and 14*a* and the units digits registers 215 of the connectors 12*b*, 13*b* and 14*b*. In time coincidence with the described negative units pulses, the ring circuit 20 produces positive units pulses on the ten units pulse conductors 31*a*, 31*b*–31*j* forming the cable 31, which are transmitted to the units gate circuits of the distributor 15 and also to the pulse gate circuits of a channel pulse commutator 22. The positive units pulses developed upon the two conductors 31*a* and 31*f* are also employed to control a bias and ringing carrier supply circuit 26. The positive and negative units pulses are sequentially developed on the units leads 31 and 30, respectively, at a frequency rate of 100 kilocycles and each tenth positive units pulse, i. e., each pulse appearing on the units pulse conductor 31*j*, is used to step or trigger a tens pulse ring circuit 21 having the function of developing the positive and negative tens pulses, each of which spans the time interval of ten units pulses. The positive tens pulses as sequentially produced by the ring circuit 21 on the tens pulse conductors 32*a*, 23*h*–31*j* forming the cable 32 are impressed upon the tens pulse gate circuits of the multiplexer 11 and the tens pulse gate circuits of the distributor 15 in the manner more fully explained below. The negative tens pulses as produced by the ring circuit 21 in time coincidence with the positive tens pulses and as sequentially impressed on the tens pulse conductors 33*a*, 33*b*–33*j* forming the cable 33 are impressed on the tens coincidence tube circuits 203 of the finders 12*a*, 12*b* and 12*c* and the tens digit registers 211 embodied in the connectors 12*b*, 13*b* and 14*b*, all in the manner more fully explained below. As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34*a*, 34*b*–34*j* forming the cable 34, which are fed to the units pulse gate circuits of the multiplexer 11. These channel pulses occur at the same frequency as the units pulses, but are much narrower in width. For example the channel pulses appearing on the conductor 34*a* are much narrower than the units pulses appearing on the positive units pulse lead 31*a* and are preferably so phased relative to the units pulses that each channel pulse occurs well within the limits of the coincident positive units pulse. Commutator drive pulses as derived from the commutator drive circuit 25 are also transmited directly over a commutator drive pulse conductor 35 to the out gate circuits 224 and 226 of each of the connectors 12*b*, 13*b* and 14*b*.

The common equipment 17 further comprises a link allotter 24 having the function of developing link allotting pulses of relatively long duration (preferably each pulse persists for at least one millisecond) successively on the link allotting conductors 36*a*, 36*b* and 36*c*. These conductors individually extend to the pulse combining circuits 202 of the finders 12*a*, 13*a* and 14*a* and the pulses impressed thereon perform the function of rendering the respective corresponding links available for use providing the links are not already ocupied with calls.

As indicated above, the line circuits 10, 16, etc., individually terminating the lines of the system, perform the function of transmitting ringing current to their respective associated substations. Keyed ringing current transmission from any line circuit terminating a called idle line is effected at a predetermined slow rate of the order of one second on and four seconds off, under the control of the bias and ringing carrier supply circuit 26 and a keying circuit 27 which are embodied in the common equipment 17 and are connected to each of the line circuits 10, 16, etc., over common multiple conductors 37 and 38. The common equipment also includes dial tone and busy tone sources which are collectively indicated at 29 in Fig. 4 of the drawings and are respectively connected by way of the multiple conductors 46 and 47 to the supervisory tone gate circuits 225 of each of the connectors 12*b*, 13*b* and 14*b*. The common equipment further comprises a ring-back tone generator 29*c*, the output signal of which is keyed by the ringing keying circuit 27 and supplied to the supervisory tone gate circuits 225 of each of the connectors 12*b*, 13*b* and 14*b* over a common multiple conductor 48. Finally, the common equipment includes a ringing supply circuit 60 which embodies a 20 cycle ringing current source and which is connected by way of two common multiple conductors 61*a* and 61*b* within the cable 61 to each of the line circuits of the system.

The circuit details of all of the components of the system referred to above are described in the above-identified copending application. An understanding of these details is not required in order to understand the present invention, and accordingly a description thereof is not included herein. However, a clear understanding of the general mode of operation is necessary before the details of the present invention may be understood. In order to render the general mode of operation of the system more readily apparent, a pulse chart has been illustrated in Figs. 6 to 9, inclusive, to show the relative widths of the pulses developed by the common equipment components 19, 25, 20, 21 and 22 during two successive pulse frames, as well as the time or phase relationship between the pulses. As there shown, the units pulse ring drive pulses 95*a*, appearing on the conductor 40 are produced by the phase shifter and pulse former circuit 19 along the zero potential reference line 95 at a frequency rate of one megacycle and are of positive polarity. Similarly, the channel pulse commutator drive pulses 96*a* appearing on the conductors 41 and 35 are produced by the phase shifter and pulse former network 19 along the zero potential reference line 96 at the same frequency of one megacycle and are of positive polarity. It will be noted that both the units pulse ring drive pulses 95*a* and the commutator drive pulses 96*a* are very narrow, i. e., persist for very short time intervals, and that the pulses 96*a* are so displaced in time relative to the pulses 95*a* that each commutator drive pulse 96*a* occurs approximately at the middle of the period separating the preceding and succeeding units pulse ring drive pulses 95*a*. The positive units pulses appearing respectively on the units pulse conductors 31*b*, 31*c*–31*j* and the negative units pulses coincidentally appearing on the units pulse conductors 31*a*, 31*b*–31*j* are produced along the zero potential reference lines 62, 63–71. More specifically, the positive units pulses produced along these potential reference lines and appearing on the units pulse conductors 31 are shown in solid lines, whereas the coincident negative units pulses produced along the same reference lines and appearing on the units pulse conductors 30 are shown in dash lines. It will be noted that the units pulses are produced by the units pulse ring circuit 20 at the fundamental frequency rate of one megacycle. However, due to diversion of the pulses successively to different ones of the units pulse conductors *a*, *b*–*j*, the pulses along any particular zero potential reference line, such, for example, as the line 62, recur only at a frequency rate of one hundred kilocycles. It will also be noted that the units pulses, both positive and negative, are successively produced on the units pulse conductors 30 and 31 in the order of alphabetical designation of these conductors. Thus, successive positive and coincident negative units pulses produced along any particular zero potential reference line, as, for example, those occurring during the units pulse periods 62*a*, 62*b*, 62*c*, etc., along the potential reference line 62, are separated by a time interval equaling the sum of nine units time positions and during which units pulses are produced successively along each of the nine other zero potential reference lines.

The negative tens pulses successively produced by the tens pulse ring circuit 21 on the tens pulse conductors 33*a*, 33*b*–33*j* and the positive tens pulses coincidentally produced on the tens pulse conductors 32*a*, 32*b*–32*j* are illustrated as appearing along the ten zero potential reference lines 72 to 81, inclusive. Here also, the positive tens pulses are shown in solid lines, whereas the coincidentally produced negative tens pulses are shown in dash lines. It will be noted that each tens pulse persists for a time interval exactly equaling the time required to produce ten units pulses. Thus the positive and negative tens pulse 72*a* persists for the duration of the interval in which the ten units pulses 62*a*–71*a* are successively produced by the units pulse ring circuit 20. It will also be noted that the starting point of each tens pulse period 72*a*, 73*a*, 74*a*, etc., is exactly coincident with the starting points of the positive and negative units pulses 62*a*, 62*b*, 62*c*, etc., appearing along the zero potential reference line 62 and impressed upon the units pulse conductors 30*a* and 31*a*, respectively, by the units pulse ring circuit 20. Further, each tens pulse period terminates at the exact instant of termination of the positive and negative units pulses 71*a*, 71*b*, 71*c*, etc., appearing along the zero potential reference line 72 and produced by the units pulse ring circuit 20 on the conductors 30*j* and 31*j*, respectively. The described synchronism between the time positions of the tens pulses and the time positions of the units pulses successively produced on the units pulse conductors by the ring circuit 20 is obtained and maintained by employing the trailing edges of the positive units pulses appearing on the last positive units pulse conductor 31*j* to step or trigger the tens pulse ring 21 on a periodic basis.

The channel pulses which are successively produced on the ten channel pulse conductors, 34*a*, 34*b*–34*j* by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96*a* appearing along the zero potential reference line 96. Like the positive and negative units pulses, the channel pulses are produced at the fundamental frequency rate of one megacycle, but due to the action of the commutator 22 in diverting these pulses successively to the conductors 34*a*, 34*b*–34*j* recur only on each of these conductors at a rate of one hundred kilocycles. Thus the channel pulses 82*a*, 82*b*, 82*c*, etc., appearing along the reference line 82 and impressed on the conductor 34*a* are spaced apart timewise by like intervals each of which exactly equals the sum of ten units pulse time periods. During this spacing interval, nine additional channel pulses are successively produced along the reference lines 83, 84–91 to appear on the conductors **34*b*, 34*c*–34*j*. It will also be noted that the channel pulses are very narrow in width, having a persistence interval of the order of one fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95*a*, to open the gating circuits of the channel pulse commutator 22** in the manner more fully explained below. The purpose of thus positioning the signal bearing pulses in the units time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 6 to 9, inclusive, in mind, it will readily be understood that each pulse or time position frame is divided into one hundred readily identifiable time positions. Thus the first ten time positions of each pulse frame, which are respectively assigned to the lines of the system having the directory number designations 11, 12—10, are defined by the first tens pulse period **72*a* of the frame within which the ten units pulse periods 62*a*, 63*a*, 64*a*–71*a* occur. Similarly, the second ten time positions, which are respectively assigned to the lines of the system having the directory number designations 21, 22, 23—20, are defined by the second tens pulse period 73*a* during which the ten units pulse periods 62*b*, 63*b*, 64*b*–71*b* occur. Again, the third ten time positions, which are respectively assigned to the lines of the system having the directory number designations 31, 32, 33—30, are marked out by the third tens time period 74*a* during which the ten units pulse periods 62*c*, 63*c*, 64*c*–71*c* occur. Thus it will be understood that the time position of each pulse frame which is assigned to the illustrated line 23 occurs during the second tens pulse interval 73*a* of each pulse frame and is coincident with the units pulse period 64*b* of each pulse frame It will also be apparent that the corresponding signal pulse 84*b* occurs well within the limits of this time position. Similarly, the time position 32 assigned to the illustrated line 32 occurs during the third tens pulse time interval 74*a* of each pulse frame and is coincident with the second units pulse period 63*c* of each pulse frame. Here again, each channel pulse 83*c* corresponding to the line 32 occurs well within the limits of the particular time position assigned to the line 32** in each pulse frame.

*Operation of the system as a whole*

Briefly to consider the general mode of operation of the system, it may be assumed that the substation B is called from the substation A during a period when the finder-connector link 12 is idle and is allotted for use under the control of the link allotter 24. When the receiver or hand set at the substation A is lifted from its supporting hook or cradle to initiate the call, a loop circuit including the conductors of the line 23 is closed to the line circuit 10, with the result that this line circuit immediately operates to change the magnitude of the bias potential which it delivers over the conductor 53 to the units gating circuit of the multiplexer 11 which individually corresponds to the line 23. The multiplexer 11 responds to this change in magnitude of the controlling bias potential supplied thereto from the line circuit 10 by opening the units gate corresponding to the line 23 to permit the ten pulses **84*a*, 84*b*, 84*c*, etc., to pass through this gate. The tens gate circuit controlled by the tens pulse 73*a* corresponding to the ten line subgroup including the line 23, is, however, only opened in coincidence with the signal pulse 84*b* during each pulse frame. Accordingly, only the signal pulses 84*b* occurring during the time position 64*b* of successive pulse frames, are permitted to pass over the common conductor 50 to the pulse input circuits 200 of the finders 12*a*, 13*a* and 14*a* and the in gate circuits 207 and 223 of the conductors 12*b*, 13*b* and 14*b* in parallel. At this point the pulses transmitted from the multiplexer 11 over the common conductor in the time position 64*b* may be regarded as multiplexer pulses 84*b*. Since only the link 12 is conditioned by the allotter 24 and the combining circuit 202 of the finder 12*a* to handle the call, and the connector 12*b* of this link is as yet inoperative, only the finder 12*a* initially responds to the multiplexer pulses 84*b* delivered thereto from the multiplexer 11 over the conductor 50 in the described time position 64*b***.

In the finder **12*a* the multiplexer pulses 84*b* are repeated by the pulse input circuit 200 to effect substantially immediate operation of the +B switching circuit 201 embodied in this finder, whereby operating anode potentials are delivered to the tubes of the circuits 209, 211, 212, 213, 214, 215, 216, 218, 219, 223, 224 and 225 of the connector 12*b* over the +B switch conductor 12*c*, with the result that the connector 12*b* is conditioned for operation, i. e., conditioned to respond to signal carrying multiplexer pulses delivered thereto from the multiplexer 11 over the conductor 50. Operation of the +B switching circuit in the finder 12*a* also has the effect of conditioning the tens and units coincidence tube circuits 203 and 204 of this finder for operation under the joint control of the multiplexer pulses 84*b* repeated by the input circuit 200, the negative tens pulses developed by the tens pulse ring circuit 21 and the negative units pulses developed by the units pulse ring circuit 20. In responding to the tens and units pulses impressed thereon coincidentally with the multiplexer pulses 84*b*, the tens and units coincidence tube circuits 203 and 204 of the finder 12*a* cooperate with the finder pulse forming circuit 205 and the combining circuit 202 of this finder to produce finder gating pulses which are transmitted over the conductor 12*d* to the circuits 207, 208 and 226 of the connector 12*b* and have the effect of initially limiting the response of the connector only to multiplexer pulses 84*b* appearing in the time position 64*b*. The combining circuit 202 of the finder 12*a* also gates busy pulses in the time position 64*b* which are fed over the common busy lead 52 to each of the other finders and connectors of the system to prevent these finders from responding to multiplexer pulses occurring in this time position. Thus the line 23 is guarded against intrusion on an incoming call. In addition, the pulses gated by the circuit 202 to the conductor 12*d* are impressed upon the pulse input circuit 200, thereby to render the finder 12*a* responsive only to multiplexer pulses 84*b* appearing in the time position 64*b*. Finally, the busy pulses developed in the time position 64*b* render the finder 12*a* non-responsive to link allotter pulses impressed upon the allotter conductor 36*a*, individual to the link 12, by the allotter 24. After the finder 12*a* has operated to perform the described functions, continued holding of the finder 12*a* is dependent upon continued acceptance and transmission of multiplexer pulses 84*b* by the pulse input circuit 200, which of course means that the finder will remain associated with the calling line 23** only so long as a calling condition persists on this line.

As indicated above, when the +B switching circuit 201 of the finder **12*a* operates to apply operating anode potential to the conductor 12*c*, the circuits 209, 211, 212, 213, 214, 215, 216, 218, 219, 223, 224 and 225 of the connector 12*b*** are conditioned for operation. Immediately anode potential is applied to the dial tone gating tube of network 225, this network functions to transmit a dial tone signal, derived from the dial tone generator 29b over the conductor 47, to the calling line out gate circuit 226 over the conductor 244. This circuit in responding to the dial tone signal and also to the finder gate pulses delivered thereto over the conductor 12d and the commutator drive pulses 96a delivered thereto over the conductor 35, functions to repeat over the channel conductor 51 to the distributor 15 connector signal pulses modulated in accordance with the dial tone signal in the time position 64b assigned to the calling line. The distributor 15 responds to the connector signal pulses thus transmitted thereto by repeating the same through the tens and units gate circuits thereof over the conductor 44a to the line circuit 10. In the line circuit 10, the dial tone signal is detected and transmitted over the line 23 to signal the calling subscriber that the dialing operation may be initiated.

Two digits of dial impulses must be dialed into the connector 12b in order to effect selection in the connector of the time position 63c assigned to the called line 32. More specifically, the directory number digits 3 and 2 must be dialed successively into the connector 12b to effect selection of the time position 63c. During the open circuit period of each dial impulse, the control bias supplied by the line circuit 10 to that units gate circuit of the multiplexer 11 which corresponds to the calling line 23 is returned to its on hook value to interrupt the transmission of multiplex pulses 84b over the conductor 50 to the pulse input circuit 200 of the finder 12a and to the in gate circuits 223 and 207 of the connector 12b. At this point, it is noted that the +B switching circuit has a time delay feature incorporated therein which prevents this circuit from removing operating anode potential from the conductor 12c during the open circuit periods of dial impulses, hook switch flashing and the like. Thus premature release of the link 12 during dialing is positively prevented through the action of the +B switching circuit 201 to maintain operating anode potential upon the conductor 12c during the open circuit period of each dial impulse. With the +B switching circuit 201 operating to supply anode potentials to the tubes of the coincidence tube circuits 203 and 204 of the finder 12a, finder gating pulses continue to be transmitted over the conductor 12d to the circuits 207, 208 and 226 of the connector 12b. Thus these circuits are held in condition to respond to intelligence and control signals delivered thereto from the multiplexer 11 on multiplexer pulses 84b impressed upon the conductor 50 in the time position 64b.

During the make period of each impulse dialed at the calling substation multiplexer signal pulse transmission from the multiplexer 11 to the finder 12a and the conductor 12b in the time position 64b is resumed. As controlled by the finder gating pulses delivered to the circuits 207 and 208 from the circuit 202 over the conductor 12d, the circuits 207 and 208 function to repeat any intelligence or control signals derived from the calling line 23 to the dial impulse integrator circuit 209. This circuit differentiates between intelligence modulated multiplexer pulses and dial impulse modulated multiplexer pulses in such manner that only the latter appear at the output terminals of this circuit. More specifically, during each dial impulse generated at the calling substation A, the impulse integrator circuit 209 develops coincident impulses which are impressed upon the tens changeover gate circuit 210 and the units start gate circuit 213 over the conductors 227 and 228, respectively. Pending operation of the tens sequence timing circuit 212, the units start gate circuit 213 is held non-responsive to the three impulses transmitted thereto by the dial impulse integrator circuit 209 during dialing of the first digit 3 at the calling substation. However, the tens changeover gate circuit functions to repeat the three impulses over the conductors 230 and 231 respectively to the tens digit register circuit 211 and the tens sequence timing circuit 212. In responding to the three impulses thus transmitted thereto, the tens digit register 211 is driven to a setting wherein tens pulses appearing on the negative tens pulse conductor 33c in the third tens time position 74a of each pulse frame may be transmitted through the third tens gate of this register and over conductor 232, to the connector pulse forming circuit 217. Transmission of the three impulses individually corresponding to the three break periods of the first digit dialed at the calling substation over the conductor 231 to the tens sequence timing circuit 212 has the effect of conditioning this circuit to block the tens changeover gate circuit from repeating impulses to the tens digit register 211 during dialing of the second digit and to render the units start gate circuit 213 operative to repeat the pulses delivered thereto by the dial impulse integrator circuit 209 during dialing of the second digit at the calling substation. Immediately the first dial impulse is repeated to the tens digit register 211 to drive this register off normal, a control potential is developed on the conductor 233 which biases the dial tone gate tube of the network 225 beyond cutoff, such that dial tone transmission through this gate tube to the calling line out gate circuit 226 over the conductor 244 is terminated. Thus, transmission of the dial tone signal to the calling substation A is arrested.

During the interdigit pause which separates dialing of the first and second digits at the calling substation, the tens sequence timing circuit 212 assumes a stable operating condition wherein a controlling potential is impressed upon the conductor 234 to bias the tens changeover gate circuit 210 against repeating further impulses transmitted thereto from the dial impulse integrator circuit 209. In assuming this condition, the tens sequence timing circuit 212 also changes the potential level on the conductor 235 to render the units start gate circuit operative to repeat impulses delivered thereto from the dial impulse integrator circuit 209 to the units changeover gate circuit 214 over the conductor 238.

During dialing of the second digit 2 at the calling substation A, the dial impulse integrator circuit 209 responds by transmitting two impulses to each of the gate circuits 210 and 213. As noted above, however, the changeover gate circuit 210 is now blocked against repeating these impulses. The units start gate circiut 213 repeats the two impulses to the units changeover gate circuit 214 over the conductor 238 and the latter circuit repeats the impulses over the conductors 236 and 237, respectively to the units digit register 215 and the units sequence timing circuit 216. As a consequence, the units digit register is operated or driven to open the second units gate circuit therein, thereby to establish a path for the transmission of units pulses appearing in the time positions 63a, 63b, 63c, etc., to the connector pulse forming circuit 217. The two pulses repeated to the units sequence timing circuit 216 over the conductor 237 serve to condition this circuit for operation at the end of the second digit.

At the end of the second digit dialed into the connector 12b the units sequence timing circuit 216 operates to change the potential level on the conductor 241 to a value such that the units changeover gate circuit 214 is blocked against further pulse transmission therethrough. Concurrently, a potential is applied to the conductor 242 in the units sequence timing circuit 216 which has the effect of rendering the busy test circuit 218 operative to determine the idle or busy condition of the called line by testing the time position 63c assigned to this line.

The potential applied to the conductor 242 also has the effect of rendering the connector pulse forming circuit 217 operative to mix the tens and units pulses respectively transmitted thereto from the registers 211 and 215 over the conductors 232 and 245 to produce a resultant connector pulse which appears on the conductor 239. More specifically, the tens pulses 74a appearing on the negative tens pulse conductor 33c and gated by the tens digit register 211 are transmitted to the connector pulse forming circuit 217 over the conductor 232 where they are mixed with the negative units pulses appearing in the time position 63*c* which are gated by the units register 215 and transmitted to the circuit 217 over the conductor 245. Mixing of these pulses in the circuit 217 results in the production of a resultant connector pulse which occurs during each pulse or time position frame in the time position 63*c* assigned to the called line. These pulses are transmitted over the conductor 239 to the connector components 218, 220, 222, 223 and 224.

Effectively, the busy test circuit 218 and the busy lock circuit 219 cooperate to perform the busy test operation in the connector 12*b*. More specifically, if the called line 32 is busy, i. e., occupied with a call, busy pulses are present on the common busy conductor 52 in the time position 63*c* assigned to the called line. The manner in which such busy pulses are applied to the conductor 52 in another link occupied with the call involving the line 32 will be apparent from the foregoing explanation. These busy pulses are impressed upon the busy test circuit 218 coincidentally with the connector pulses developed by the connector pulse forming circuit 217 and impressed upon the busy test circuit 218 over the conductor 239. Coincidence between the connector pulses and the busy pulses has the effect of preventing the busy test circuit from operating. Thus the busy condition of the called line is indicated.

In the event the called line is busy, the busy lock circuit 219 as controlled over the conductors 242 and 246 and through the resistor 247 from the units sequence timing circuit 216 measures a predetermined time interval, i. e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone source by way of the conductor 46, the busy gate circuit in the network 225, the calling line out gate circuit 226, the channel conductor 51, the distributor 15 and the line circuit 10 to the calling line. Thus the calling subscriber is advised of the busy condition of the called line.

Assuming that the called line 32 is idle at the time the time position 63*c* assigned thereto is selected in the connector in the manner explained above, such busy pulses as may be present on the common busy lead 52 do not occur coincidentally with the connector pulses generated by the connector pulse forming circuit 217 in the time position 63*c* assigned to the called line. When coincidence between the connector pulses and the busy pulses is lacking, the busy test circuit operates immediately the first connector pulse is impressed thereon from the connector pulse forming circuit 217 over the conductor 239. In operating, the circuit 218 impresses a positive potential upon the cut-through conductor 251 which is applied to the busy lock circuit 219 to prevent the latter circuit from operating at the end of the busy test interval. The positive potential applied to the cut-through conductor 251 in the busy test circuit 218 when this circuit operates is also applied to the called line out gate circuit 224 to condition the latter circuit to repeat connector signal pulses in the time position 63*c* to the distributor 15, and is applied to the busy gate circuit 220 so that connector pulses are released to the busy conductor 52 and is also applied to the network 225 to act as an operating anode potential for the ring back tone gate tube of this network. The positive potential developed on the cut-through conductor 251 is also applied to the called line in-gate circuit 223 and the called line reconstructor circuit 222, thereby to condition these circuits to accept signals derived from the called line. This feature of making operation of the circuits 223 and 222 dependent upon operation of the busy test circuit to indicate that the called line is idle, is necessary in order to prevent the calling subscriber from listening in on a conversation being held over the called line when the called line is busy.

The positive potential applied to the cut-through conductor 251 is also impressed upon the ring trip circuit 221 and is applied through certain components of this circuit to the ring trip conductor 253 which extends to both the called line out gate circuit 224 and to the ring back tone gate circuit of the network 225. When this occurs, the ring back tone gate circuit of the network 225 is rendered operative to transmit the intermittent ring back tone signal derived from the keying circuit 27 over the conductor 48 to the calling line out gate circuit 226 over the conductor 244. The ring back tone signal is modulated on the signal pulses developed by the out gate circuit 226 and thus transmitted by way of the conductor 51 and the distributor 15 to the line circuit 10. In the line circuit 10, the ring back tone signal is detected and transmitted over the calling line 23 to the calling substation. Thus the calling subscriber is signaled that the called substation is being rung.

When the called line out gate circuit 224 is conditioned for operation through application of the described positive potential to the cut-through conductor 251, it responds to the connector pulses impressed upon the connector pulse conductor 239 by connector pulse forming circuit 217 by gating certain commutator drive pulses derived from the commutator drive circuit 25 over the conductor 35. More specifically, the commutator drive pulses transmitted over the conductor 35 by the commutator drive circuit 25 are gated by the connector pulses produced on the conductor 239 in the time position 63*c* assigned to the called line, whereby very narrow connector signal pulses are released over the conductor 51 to the distributor 15 which are well within the limits of the time position 63*c* assigned to the called line. So long as the positive potential applied to the cut-through conductor 251 in the busy test circuit 218 is fed through the ring trip circuit 221 to the ring trip conductor 253, the called line out gate circuit 224 is controlled to release connector signal pulses to the distributor 15 in the time position 63*c* which are approximately fifty percent larger in amplitude than those used to convey intelligence signals to the distributor 15 after the call is answered at the called substation B. These large amplitude signal pulses are diverted by the distributor 15 to the line circuit 16 and serve to signal this line circuit that the ringing operation should start.

More specifically, the large amplitude connector signal pulses are released by the distributor 15 to the line circuit 16 over the conductor 54*a*. In this line circuit, these pulses have the effect of activating the ringing control facilities of the line circuit 16, with the result that ringing current keyed at a slow rate of approximately one second on and four seconds off is transmitted over the line 32 to energize the ringer provided at the called substation B. Ringing of the called substation persists until the call is answered or until the call is abandoned at the calling substation A. Assuming that the call is answered, the line circuit 16 functions to change the magnitude of the control potential supplied over the conductor 45 to the multiplexer 11 with the result that the gate assigned to the called line 32 in the multiplexer 11 is opened to permit multiplexer pulses 83*c* occurring in the time position 63*c* of each pulse frame to be transmitted through the corresponding tens and units gate circuits of the multiplexer 11 and over the conductor 50 to the multiplexer input terminals of each of the finders and connectors of the system.

The multiplexer pulses 83*c* are impressed upon the calling and called line in gate circuits 207 and 223 in the connector 12*b*. In the calling line in gate circuit 207, the repeated multiplexer pulses 83*c* are not in coincidence with the finder gate pulses impressed upon the circuit 207 over the conductor 12*d* and hence are not repeated to the reconstructor circuit 208. However, in the called line in gate circuit 223 the multiplexer pulses 83*c* occur in the time coincidence with the connector pulses impressed upon the circuit 223 over the connector pulse conductor 239 from the connector pulse forming circuit 217. As a consequence, the call answering signal carried thereby is gated to the reconstructor circuit 222 where it is detected to produce a potential on the conductor 252 which has the effect of tripping the ring trip circuit 221. In operating, the ring trip circuit 221 functions substantially to decrease the positive potential on the ring trip conductor 253. The called line out gate circuit 224 responds to this reduction in potential on the conductor 253 by decreasing by approximately fifty percent the amplitude of the connector signal pulses transmitted over the conductor 51 and through the distributor 15 to the line circuit 16. The ringing control facilities of the line circuit 16 respond to this decrease in the amplitude of the connector signal pulses delivered thereto by terminating the transmission of ringing-current to the called substation. Thus the ringing operation is arrested. The decrease in the positive potential present on the ring trip conductor 253 which occurs when the ring trip circuit 221 operates also has the effect of closing the ring back tone signal transmission gate of the network 225, with the result that transmission of the ring back tone signal to the calling substation is arrested.

Following the described operations in the connector 12*b*, a two-way talking or communication circuit is fully established between the calling substation A and the called substation B. Thus, voice or other signals developed at the substation A and transmitted over the line 23 to the line circuit 10 serve to vary the bias voltage impressed upon the gate circuit of the multiplexer 11 over the conductor 53 directly in accordance with the instantaneous amplitude of such signals. As a consequence, the multiplexer pulses 84*b* released by the multiplexer 11 over the conductor 50 to the finders and connectors of the system in the time position 64*b* are modulated in accordance with the voice or other signals developed at the calling substation A. These signal modulated multiplexer pulses cannot be accepted by any finder of the system other than the finder 12*a* or any connector of the system other than the connector 12*b* because of the busy pulses fed to the busy conductor 52 from the circuit 205. In the finder 12*a*, the multiplexer pulses 84*b* maintain the +B switching circuit 201 operated to hold the link 12 associated with the line 23. The signal modulated multiplexer pulses 84*b* are also transmitted through the calling line in gate circuit 207 and over the conductor 255 to the calling line reconstructor circuit 208 where they occur in time coincidence with the finder gating pulses impressed upon the reconstructor circuit over the conductor 12*d* in the time position 64*b*. As a consequence, the voice signal components thereof are detected or reconstructed and stored in the reconstructor circuit 208. This stored signal information is impressed upon the called line out gate circuit 224 over the conductor 256. In the called line out gate circuit, the signals derived from the calling line reconstructor circuit 208 are modulated upon the connector signal pulses developed by the out gate circuit 224 in the time position 63*c* assigned to the called line. These modulated signal pulses are transmitted to the distributor 15 over the conductor 51 and released by the distributor 15 to the line circuit 16. In the line circuit 16, the signal components of the connector signal pulses are detected and transmitted over the line 32 to the called substation B where they are audibly reproduced by the receiver of the telephone instrument provided at the called substation.

Voice signals developed at the called substation B and transmitted over the line 32 to the line circuit 16 cause the bias potential delivered over the conductor 45 to the gate circuit of the multiplexer 11 which corresponds to the called line 32 to vary in exact accordance therewith. As a consequence, the voice signals are modulated upon the multiplexer pulses 83*c* occurring in the time position 63*c* and released through the units and tens gates of the multiplexer and over the conductor 50 to the finders and connectors of the system. These signal modulated multiplexer pulses cannot be accepted by any finder of the system for the reason that the finder 12*a* is synchronized to accept only multiplexer pulses 84*b* occurring in the time position 64*b* and the busy pulses fed to the busy conductor 52 in the time position 64*b* assigned to the called line by the busy gate circuit 220 of the connector 12*b* prevent the other finders from accepting or responding to the described signal modulated multiplexer pulses 83*c*. In the connector 12*b*, the signal modulated multiplexer pulses 83*c* are impressed upon the calling and called line in gate circuits 207 and 223 and are repeated by the circuits 223 over the conductor 254 to the called line reconstructor circuit 222. Due to lack of coincidence between the signal bearing multiplexer pulses 83*c* and the finder gating pulses impressed upon the calling line in gate circuit 207 over the conductor 12*d*, the circuit 207 does not gate these pulses to the reconstructor circuit 208. By virtue of the coincidence between the signal bearing multiplexer pulses 83*c* and the connector pulses appearing coincidentally on the conductor 239, both of which are impressed upon the called line reconstructor circuit 222, this circuit detects or reconstructs and stores the voice signal components carried by the multiplexer pulses 83*c*. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12*d*. The voice signal modulated pulses developed in the calling line out gate circuit 226 are released by the distributor 15 in the time position 64*b* and are diverted to the line circuit 10 through the gating circuit of the distributor which corresponds to the calling line. In the line circuit 10, the signal components of the pulses released by the calling line out gate circuit 226 are detected and transmitted over the line 23 to the calling substation A where they are audibly reproduced by the receiver of the telephone instrument provided at this substation.

As will be apparent from the foregoing explanation, a fully complete two-way talking circuit is established between the calling and called substations. Moreover, this circuit effectively comprises two mutually non-interfering channels between the calling line 23 and the called line 32 such that voice signals simultaneously produced at both substations will be transmitted without interference through the switching equipment of the system to the appropriate destination point or substation. This non-interfering feature of the system primarily results from the assignment of two discrete and non-interfering time positions in each time position frame for the transmission of voice or intelligence modulated signals simultaneously through the switching equipment of the system in both directions. Secondarily, it results from physical separation of the intelligence gating circuits in the connector 12*b* into six discrete components. Thus the calling line in gate circuit 207, the calling line reconstructor circuit 208 and the called line out gate circuit 224 are used only to repeat intelligence or voice signals from the calling line to the called line, whereas the called line in gate circuit 223, the called line reconstructor circuit 222 and the calling line out gate circuit 226 are used only to repeat intelligence or voice signals from the called line to the calling line.

In describing the manner in which the system components 10, 11, 12*a*, 12*b*, 15 and 16 are partially or wholly released upon termination of the call, it may be assumed first that the called party at the substation B is the first to hang up. In such case, the bias potential delivered from the line circuit 16 over the conductor 45 to the gating circuit of the multiplexer 11 individually assigned to the called line 32 is restored to its normal value when the called line loop circuit is opened, with the result that multiplexer pulses 83c appearing in the time position 63c are no longer transmitted over the conductor 50 to the finders and connectors of the system. Such termination of the multiplexer pulse transmission in the time position 63c to the finders and connectors of the system has no effect other than inactivation of the connector components 223 and 222 and the removal of modulation components from the connector signal pulses transmitted by way of circuit 226 and the distributor 15 to the line circuit 10. In other words, busy pulses in the time position 63c assigned to the called line continue to be fed to the busy conductor 52 from the busy gate circuit 220 of the connector 12b, thereby to prevent the called line 32 from originating a call or accepting an incoming call. This of course means that if the called subscriber picks up his receiver or hand set before the connection is released at the calling substation A, conversation may be resumed between the calling and called subscribers.

When the calling subscriber disconnects by replacing the receiver or hand set at the substation A on its supporting hook or cradle, the loop circuit extending by way of the line 23 to the line circuit 10 is opened, with the result that the bias potential applied over the conductor 53 to that gate circuit of the multiplexer 11 which individually corresponds to the calling line 23 is restored to its normal value. As a consequence, this gate circuit is biased to terminate the transmission of multiplexer pulses 84b occurring in the time position 64b over the conductor 50 to the various finders and connectors of the system. When the transmission of multiplexer pulses 84b to the pulse input circuit 200 of the finder 12a is thus terminated, this circuit is rendered inactive to repeat pulses to the finder circuits 201, 203 and 204. After a predetermined time interval, measured by the overall time constant of the +B switching circuit 201, this circuit responds to cessation of multiplexer pulse transmission thereto by removing the operating anode potential from the conductor 12c. As a consequence, the tens and units coincidence tube circuits 203 and 204 of the finder 12a are restored to normal to interrupt the production of finder gate and busy pulses in the time position 64b by the finder pulse forming circuit 205. Thus, the application of pulses to the combining circuit 202 and hence to the busy conductor 52 in the time position 64b assigned to the calling line 23 is arrested. Termination of pulse transmission to the combining circuit 202 in the time position 64b has the effect of rendering this circuit operative under the control of the link allotter 24 to reassociate the link 12 with another calling line to handle another call. Cessation of busy pulse transmission to the conductor 52 in the time position 64b has the effect of marking the calling line 23 as idle to permit initiation of a second call on this line or seizure of the line on a call incoming thereto.

Removal of operating anode potential from the conductor 12c also has the effect of restoring the component circuits 209, 211, 212, 213, 214, 215, 216, 218, 219, 223, 224 and 225 of the connector 12b to normal, thereby to condition the connector 12b to handle another call. Incident to normalizing of the connector pulse forming circuit 217, connector pulse production on the conductor 239 in the time position 63c assigned to the called line 32 is terminated to arrest the application of busy pulses to the common busy conductor 52 by the busy gate circuit 200 in this time position. Thus the called line is unguarded to free the same for use in initiating another call or accepting a call incoming thereto. It will be noted that normalizing of the identified circuits of the connector 12b has the effect of restoring all components of this connector to the condition which prevailed at the time the link 12 was taken into use to handle the call just described.

As will be evident from the immediately preceding explanation, the key component involved in effecting release off the link 12 is the +B switching circuit 201 embodied in the finder 12a. So long as multiplexer pulses are repeated to this circuit by the pulse input circuit 200 in the time position assigned to the calling line, the circuit positively prevents release of the link 12 and holds both the calling and called lines out of service, i. e., prevents use of the same in initiating outgoing calls or accepting incoming calls. However, when multiplexer pulse transmission by way of the pulse input circuit 200 to the +B switching circuit 201 is arrested for a period of time greater than approximately one fourth of a second, this switching circuit immediately effects release of the link regardless of the extent of progress of the call and regardless of whether or not the connection has been released at the called substation. Thus normalizing of the +B switching circuit 201 will effect release of the link 12 upon abandonment of the call which the link is assigned to handle at any point in the process of setting up the desired connection, as for example, call abandonment before dialing is started, call abandonment after dialing is partially completed or call abandonment after dialing is completed and before the call is answered at the called substation. It will also be apparent that if the calling subscriber is the first to release the connection, i. e., hang up, the link 12 is immediately released under the control of the +B switching circuit 201 embodied in the finder 12a. In such case, the line circuit 16 associated with the called line 32 immediately assumes a setting indicating that the line 32 is calling, with the result that a link is assigned to the called line under the control of the allotter 24 and the usual dial tone signal is returned to the called subscriber. This signal has the effect of indicating to the called subscriber that the connection has been released at the calling substation and that he should hang up.

The manner in which the other links 13, 14, etc., may be selectively controlled to establish secret two-way communication connections between the various lines of the system is exactly the same as explained above with reference to the link 12 and will be fully apparent from the preceding explanation. In this connection, it will be understood that each link is only capable of handling a single call at a time, which means that the call capacity of the system is determined by the number of available links. Thus, if ten percent trunking is used, such that ten links 12, 13, 14, etc., are provided to handle calls initiated on the lines of the system, a maximum of ten connections may be set up concurrently. It will also be understood that for each talking connection established through the linkage of the system, multiplexer pulses are released to the common multiplexer output channel 50 in the two time positions respectively assigned to the calling and called lines involved in the connection. Such pulses are of positive polarity. This necessarily means that in the event ten links are provided to handle the system traffic, a maximum of twenty positive multiplexer pulses occurring in the different time positions respectively assigned to the lines involved in the connections are released to the multiplexer output channel conductor 50 during each time position frame. Similarly, pulses are released to the distributor input channel conductor 51 by the connectors occupied with the calls in the time positions respectively assigned to the lines involved in established connections, so that in the event ten links are provided and all of these links are occupied with calls, twenty pulses are released to the distributor input channel conductor 51 during each time position frame. These pulses are of negative polarity. Busy pulses are also released by the finders and connectors of the system to the busy pulse channel conductor 52 in the time position assigned to each busy line of the system. Thus it will be understood that in the event ten links are provided, all of which are occupied with calls at the same time, twenty busy pulses are released to the busy pulse channel conductor 52 in the time positions respectively assigned to the busy lines. These pulses as applied to the conductor 52 are positive with respect to ground.

*All-links-busy circuit 9*

For the purpose of indicating to a calling subscriber an all-busy condition of the finder-connector linkage provided in the system, so that the subscriber will not wait for linkage when none is available, it is conventional practice to return a special signal to the calling subscriber indicating the all-busy condition of the linkage. In accordance with the present invention, this feature is provided in a simple, reliable and improved manner through operation of the all-links-busy circuit 9 illustrated in Fig. 5 of the drawings. In brief, this circuit comprises a dual triode amplifier and demodulator tube 500, a combined modulator and pulse suppressor tube 501, and a busy pulse inverter tube 502. The identified tubes are of conventional types and are interconnected by means of the illustrated circuit components, which are referred to with particularity below in connection with the functions which they respectively perform in the circuit.

Generally considered, the circuit 9, and more particularly the tubes 500 and 501, perform the function of repeating multiplexer pulses released to the multiplexer output channel conductor 50 by the multiplexer 11 in the time positions respectively assigned to busy lines to the distributor input channel conductor 51 in the same time positions, independently of the linkage comprising the described finder-connector links 12, 13, 14, etc., when an all-links-busy condition exists. In the course of repeating the multiplexer pulses from the multiplexer output channel conductor 50 to the distributor input channel conductor 51, the signal sample modulation components of the multiplexer pulses are first removed from these pulses through the action of the tube 500 and its associated circuit components, following which these pulses are remodulated in the tube 501 with a busy tone signal derived from the busy tone source over the conductor 46. In order to prevent the busy tone modulated pulses from being released to the distributor input channel conductor 51 by the tube 501 during periods when finder-connector links are available to handle calls initiated on the lines of the system, the busy pulses developed on the busy pulse channel conductor 52 are utilized to bias the tube 501 beyond cutoff during the period of each busy pulse. To this end, the positive busy pulses distributed to the conductor 52 are inverted through the inverter tube 502 and impressed upon the second control grid of the tube 501. With this arrangement, and as explained more fully below, pulses can only be released by the tube 501 to the distributor input channel conductor 51 during a period when multiplexer pulses are applied to the inner control grid of the tube 501 and inverted busy pulses are not applied to the second control grid of the same tube.

In considering the operation of the all-links-busy circuit 9, it may be assumed that the above traced call originating at the substation A and intended for the substation B is initiated during a period when all of the finder-connector links 12, 13, 14, etc., are busy. When this condition prevails, positive multiplexer pulses occurring in the time positions respectively assigned to the busy lines of the system and modulated with signal samples derived from these lines are released to the conductor 50 by the multiplexer 11. In addition, pulses are released to the conductor 50 by the multiplexer 11 in the time position assigned to the line 23 immediately the call is initiated at the substation A. Thus, it will be understood that if ten finder-connector links are provided in the system, twenty-one pulses are released to the multiplexer output channel conductor 50 during each time position frame. Excepting the line 23, busy pulses are also released to the busy pulse channel conductor 52 in the time positions respectively assigned to the busy lines by the occupied finders and connectors of the system.

Each positive multiplexer pulse appearing on the conductor 50 is impressed upon the control grid of the left section of the twin triode tube 500 through the coupling condenser 505. This control grid is normally so biased that the left section of the tube acts as a non-linear detector such that the modulation component of each pulse is removed from the top of the pulse and a pulse of standard height is produced at the anode of this tube section. This is accomplished through the action of the biasing network comprising the potentiometer 503, the current dropping resistor 504, and the rectifier 506, the biasing potential being applied to the left control grid of the tube 500 through the back resistance of the rectifier 506. The rectifier 506 also acts in conjunction with the coupling condenser 505 to clamp the base line of the pulses appearing on the conductor 50 to a predetermined level determined by the setting of the potentiometer 503. Each positive multiplexer pulse thus applied to the left control grid of the tube 500 has the effect of increasing the voltage drop across the anode load resistor 507 so that the pulse is reproduced as a negative pulse at the left anode of the tube. This pulse is applied to the right control grid of the tube 500 through a coupling network comprising the condenser 508 and grid resistor 509, and has the effect of decreasing current flow through the right section of the tube 500 and the anode load resistor 507 so that the pulse appears as a positive pulse at the right anode of this tube. It will thus be understood that the multiplexer pulses appearing on the conductor 50 are stripped of their modulation components in the tube 500 and reproduced as positive pulses of the same amplitude at the right anode of the tube 500.

The positive pulses thus developed at the right anode of the tube 500 are impressed upon the inner control grid of the tube 501 through a coupling condenser 510. Normally this control grid is biased to a predetermined negative potential through the action of a biasing network consisting of the potentiometer 513 and the voltage dropping resistor 512 so that the positive pulses applied to this grid through the condenser 511 are potentially effective to increase space current flow through the tube 501 to produce negative pulses on the distributor input channel conductor 51. When thus repeated by the tube 501, the pulses are modulated with a busy tone signal derived from the busy tone signal source over the conductor 46 through application of the busy tone signal voltage to the suppressor grid of the tube 501.

As will be evident from the preceding explanation, in the absence of some restraining force or auxiliary control, all multiplexer pulses appearing on the multiplexer output channel conductor 50 would be stripped of their modulation components in the tube 500, remodulated with the busy tone signal in the tube 501, and repeated to the distributor input channel conductor 51 for distribution to all of the busy lines of the system. This is obviously undesirable since reproduction of the busy signal at the substations involved in connections set up through the available finder-connector linkage of the system would have the effect of interfering with conversations being held over these connections. In order to prevent the tube 501 from gating the busy signal modulated multiplexer pulses to the distributor input channel conductor 51 in the time positions respectively assigned to the lines involved in connections established through the available linkage of the system, the busy pulses appearing on the busy channel conductor 52 are utilized to bias the tube 501 beyond cutoff during each of the indicated time positions. To this end, the positive busy pulses appearing on the conductor 52 are impressed upon the control grid of the inverter tube 502 through a coupling network which comprises the coupling condenser 514 and grid resistor 515. These pulses are inverted through the tube 502 to appear as negative pulses at the anode of this tube and are impressed upon the second control grid of the gating tube 501 through the coupling condenser 516. The base line of the inverted busy pulses is clamped to the ground potential level through the action of the clamping crystal rectifier 517. Each negative pulse thus developed at the anode of the tube 502 and applied to the second control grid of the tube 501 is of sufficient amplitude to bias the latter tube beyond cutoff for the duration of the pulse and thus prevent the inner control grid of the tube 501 from exercising any control over space current flow through the tube. Since the inverted busy pulses applied to the second control grid of the tube 501 are of substantially greater width than the relatively sharp demodulated and inverted multiplexer pulses impressed upon the inner control grid of the tube 501, it will be understood that each busy pulse which occurs on the conductor 52 coincidentally with a multiplexer pulse on the conductor 50 has the effect of completely blocking the tube 501 against responding to the multiplexer pulse. Thus the busy pulses which appear on the conductor 52, are inverted through the tube 502, and applied to the second control grid of the tube 501 have the effect of preventing busy signal modulated multiplexer pulses from being repeated from the multiplexer output channel conductor 50 to the distributor input channel conductor 51 in the time positions respectively assigned to lines involved in connections set up through the available finder-connector linkage of the system.

Under the condition assumed above wherein a call is initiated at the substation A when no finder-connector linkage is available to handle the call, the multiplexer pulses released by the multiplexer 11 to the conductor 50 in the time position **64*b* are repeated to the inner control grid of the tube 501 in the exact manner explained above. In this situation, busy pulses cannot be present on the conductor 52 in the time position assigned to the calling line 23 for the reason that no finder or connector is available for association with this calling line. Accordingly, blocking pulses are not applied to the second control grid of the tube 501 in this time position, with the result that the multiplexer pulses occurring in this time position and modulated with the busy tone signal are repeated to the distributor input channel conductor 51. These pulses are transmitted back to the line circuit 10 terminating the calling line 23, are reconstructed into the busy tone signal in this line circuit and transmitted over the line 23** for reproduction at the calling substation A, all in the manner previously explained. Upon receiving this signal prior to receipt of the usual dial tone signal, the calling subscriber is advised of the all-busy condition of the available linkage in the system and under normal circumstances will abandon the call.

From the preceding explanation, it will be understood that the all-links-busy circuit 9 operates in a simple and reliable manner to signal calling subscribers of the all-links-busy condition existing in the system when all of the available linkage is in use. In contrast with conventional practice, no special wiring of the line circuits is required in order to provide this service. Further, the entire circuit is common to all lines and links of the system and consists of only three standard type tubes and a small number of standard circuit components, all of which are entirely static in character.

Although the invention has been disclosed herein with particular reference to operation of the present improved apparatus to set up communication connections between subscribers' lines, it will be readily understood by those skilled in the art that the apparatus may also be employed to interconnect interoffice or interswitch stage trunks or trunk lines with each other or in various combinations of trunks and subscribers' lines. Accordingly, the term "line" or "lines" as used herein and particularly in the claims hereof is hereby defined to include trunks or trunk lines of any and all types as well as subscriber lines. Also by way of definition, it is pointed out that the term "link" as used in the claims hereof is intended to include any switching stage of numerical (directively controllable by dial impulses) or non-numerical (non-directively controlled) type or a combination of one numerical and one non-numerical switching stage. As used in this specification, the terms "electronic" and "electronic means" refer to and are intended to define means comprising electron conductive devices such, for example, as electron tubes, gas tubes, crystal rectifiers, semi-conductors and the like, together with interconnecting circuit components therefor, and to exclude all electromechanical devices embodying moving mechanical parts such, for example, as relays, stepping switches and the like.

While one embodiment of the present invention has been disclosed, it will be understood that various modifications may be made therein without departing from the true spirit and scope of the invention as defined in the appended claims.

What is claimed as new and desired to be secured by Letters Patent of the United States is:

1. An automatic telephone system comprising a plurality of lines, a plurality of links common to said lines, means including said links for selectively establishing talking channels between different pairs of said lines, means responsive to the initiation of a call on one of said lines during periods when at least one of said links is idle for transmitting a signal over the calling line, and means responsive to seizure of the calling line by an idle one of said links for discontinuing transmission of said signal over the calling line.

2. In an automatic telephone system, a plurality of lines, a plurality of links common to said lines, an all-links-busy circuit operative to transmit an all-links-busy signal over any calling one of said lines in response to initiation of a call thereon during periods when at least one of said links is idle, and means responsive to operative association of one of said links with the calling line for preventing said circuit from transmitting said signal over the calling line.

3. An automatic telephone system comprising a plurality of lines, a plurality of links common to said lines, an all-links-busy circuit operative to transmit an all-links-busy signal over any calling one of said lines in response to initiation of a call thereon during periods when at least one of said links is idle, means responsive to operative association of one of said links with the calling line for preventing said circuit from transmitting said signal over the calling line, and means including said links for selectively establishing talking channels between different pairs of said lines.

4. An automatic telephone system comprising a plurality of lines, a plurality of all-electronic links common to said lines, an all-links-busy circuit common to said links, said circuit being operative to transmit an all-links-busy signal over any calling one of said lines in response to initiation of a call thereon during periods when at least one of said links is idle, means responsive to operative association of one of said links with the calling line for preventing said circuit from transmitting said signal over the calling line, and means including said links for selectively establishing talking channels between different pairs of said lines.

5. In an automatic telephone system, a plurality of lines having individually assigned thereto different non-overlapping time positions which recur in repetitive time position frames, multiplexing means for sampling signals produced on said lines in the time positions individually assigned to said lines, distributing means for distributing signal samples to said lines in the time positions individually assigned to said lines, a plurality of signal sample transmission links common to said lines, means including said links for receiving signal samples from said multiplexing means and transmitting signal samples to said distributor means, means responsive to the initiation of a call on one of said lines during a period when all of said links are busy for transmitting pulses to said distributing means in the time position assigned to the calling line, and means controlled by said last-named pulses for transmitting an all-links busy signal over said calling line indicating the all-busy condition of said links.

6. In an automatic telephone system, a plurality of lines having individually assigned thereto different non-overlapping time positions which recur in repetitive time position frames, multiplexing means for sampling signals produced on said lines in the time positions individually assigned to said lines, distributing means for distributing signal samples to said lines in the time positions individually assigned to said lines, a plurality of signal sample transmission links common to said lines, means including said links for receiving signal samples from said multiplexing means and transmitting signal samples to said distributor means, an all-links-busy circuit operative in response to the initiation of a call on any calling one of said lines for releasing pulses to said distributing means in the time position assigned to the calling line, means for modulating the pulses released by said circuit to said distributing means with an all-links busy signal, and means for preventing said circuit from operating in the event one of said links is idle at the time said call is initiated on said calling line.

7. In an automatic telephone system, a plurality of lines having individually assigned thereto different non-overlapping time positions which recur in repetitive time position frames, multiplexing means for sampling signals produced on said lines in the time positions individually assigned to said lines, distributing means for distributing signal samples to said lines in the time positions individually assigned to said lines, a plurality of signal sample transmission links common to said lines, means including said links for receiving signal samples from said multiplexing means and transmitting signal samples to said distributor means, an all-links-busy circuit operative in response to the initiation of a call on any calling one of said lines during periods when at least one of said links is idle for releasing pulses to said distributing means in the time position assigned to the calling line, means for modulating the pulses released by said circuit to said distributing means with an all-links busy signal, and means for preventing said circuit from releasing pulses to said distributing means in response to operative association of one of said links with the calling line.

8. In an automatic telephone system, a plurality of lines having individually assigned thereto different non-overlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, means responsive to the initiation of a call on one of said lines during a period when all of said links are busy for transmitting pulses occurring in the time position assigned to said one line from said output channel to said input channel independently of said links, and means controlled by said last-named pulses for transmitting an all-links busy signal over said calling line indicating the all-busy condition of said links.

9. In an automatic telephone system, a plurality of lines having individually assigned thereto different non-overlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, an all-links-busy circuit operative in response to the intiation of a call on any one of said lines for transmitting pulses from said output channel to said input channel in the time position assigned to the calling line, means for modulating the pulses released by said all-links-busy circuit to said input channel with an all-links busy signal, and means for preventing said all-links-busy circuit from operating in the event one of said links is idle at the time said call is initiated on said calling line.

10. In an automatic telephone system, a plurality of lines having individually assigned thereto different non-overlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, an all-links-busy circuit operative in response to the initiation of a call on any one of said lines during periods when at least one of said links is idle for transmitting pulses from said output channel to said input channel in the time position assigned to the calling line, means for modulating the pulses released by said all-links-busy circuit to said input channel with an all-links busy signal, and means for preventing said circuit from releasing pulses to said input channel in response to operative association of one of said links with the calling line.

11. In an automatic telephone system, a plurality of lines having individually assigned thereto different non-overlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, line busying means for busying said lines as they are taken into use, all-links-busy apparatus responsive to the initiation of a call on one of said lines during a period when all of said links are busy for transmitting pulses occurring in the time position assigned to said one line to said input channel independently of said links, said apparatus including means controlled by said line busying means for preventing the apparatus from operating during periods when any of said links are idle, and means controlled by the pulses released from said circuit to said input channel for transmitting an all-links busy signal over said calling line indicating the all-busy condition of said links.

12. In an automatic telephone system, a plurality of lines having individually assigned thereto different non-overlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, line busying means for busying said lines as they are taken into use, an all-links-busy circuit operative in response to the initiation of a call on any one of said lines for transmitting pulses from said output channel to said input channel in the time position assigned to said one line, means for modulating the pulses released by said all-links-busy circuit to said input channel with an all-links-busy signal, and means controlled by said line busying means for preventing said all-links-busy circuit from operating in the event one of said links is idle at the time the call is initiated on said one line.

13. In an automatic telephone system, a plurality of lines having individually assigned thereto different non-overlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, line busying means for busying said lines as they are taken into use, an all-links-busy circuit operative in response to the initiation of a call on any one of said lines during periods when at least one of said links is idle for transmitting pulses from said output channel to said input channel in the time position assigned to said one line, means for modulating the pulses released by said all-links-busy circuit to said input channel with an all-links-busy signal, and means controlled by said line busying means for preventing said all-links-busy circuit from releasing pulses to said input channel during periods when the calling line is operatively associated with one of said links.

14. In an automatic telephone system, a plurality of lines having individually assigned thereto different non-overlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, a line busying channel common to said lines, means for releasing pulses to said line busying channel in the time positions respectively assigned to said lines as said lines are taken into use, all-links-busy apparatus responsive to the initiation of a call on one of said lines during a period when all of said links are busy for transmitting pulses occurring in the time position assigned to said one line to said input channel independently of said links, said apparatus including means responsive to the pulses released to said line busying channel for preventing the apparatus from operating during periods when any of said links are idle, and means for modulating the pulses released from said circuit to said input channel with a signal indicating the all-busy condition of said links.

15. In an automatic telephone system, a plurality of lines having individually assigned thereto different non-overlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, a line busying channel common to said lines, means for releasing pulses to said line busying channel in the time positions respectively assigned to said lines as said lines are taken into use, all-links-busy apparatus responsive to the initiation of a call on one of said lines for transmitting pulses occurring in the time position assigned to said one line to said input channel independently of said links, said apparatus including means responsive to the pulses released to said line busying channel for preventing the apparatus from releasing pulses to said input channel during periods when the calling line is operatively associated with one of said links, and means for modulating the pulses released from said circuit to said input channel with a signal indicating the unavailable condition of said links.

16. In an automatic telephone system, a plurality of lines having individually assigned thereto different non-overlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, a line busying channel common to said lines, means for releasing pulses to said line busying channel in the time positions respectively assigned to said lines as said lines are taken into use, an all-links-busy circuit operative in response to the initiation of a call on any one of said lines for transmitting pulses from said output channel to said input channel in the time position assigned to said one line, means controlled by the pulses released by said all-links-busy circuit to said input channel for transmitting an all-links-busy signal over said calling line, and means responsive to the pulses released to said line busying channel for terminating transmission of said all-links-busy signal to said calling line in the event said calling line is seized by an idle one of said links.

17. In an automatic telephone system, a plurality of lines having individually assigned thereto different nonoverlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, a line busying channel common to said lines, means for releasing pulses to said line busying channel in the time positions respectively assigned to said lines as said lines are taken into use, an all-links-busy circuit operative in response to the initiation of a call on any one of said lines for transmitting pulses from said output channel to said input channel in the time position assigned to said one line, means for modulating the pulses released by said all-links-busy circuit to said input channel with an all-links-busy signal, and means responsive to the pulses released to said line busying channel for preventing said circuit from releasing pulses to said input channel when the calling line is operatively associated with one of said links.

18. In an automatic telephone system, a plurality of lines having individually assigned thereto different nonoverlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, all-links-busy apparatus responsive to the initiation of a call on any one of said lines and operative during a period when all of said links are busy for transmitting pulses from said output channel to said input channel in the time position assigned to said one line, means included in said apparatus for removing the signal sample modulation components from said last-named pulses, and means included in said apparatus for remodulating said last-named pulses with an all-links-busy signal.

19. In an automatic telephone system, a plurality of lines having individually assigned thereto different nonoverlapping time positions which recur in repetitive time postion frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, an all-links-busy circuit operative in response to the initiation of a call on any one of said lines for transmitting pulses from said output channel to said input channel in the time position assigned to said one line, means included in said circuit for removing the signal sample modulation components from said last-named pulses, means for remodulating said last-named pulses with an all-links-busy signal, and means for preventing said circuit from releasing pulses to said input channel during periods when the calling line is operatively associated with one of said links.

20. In an automatic telephone system, a plurality of lines having individually assigned thereto different nonoverlapping time positions which recur in repetitive time position frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, line busying means for busying said lines as they are taken into use, an all-links-busy circuit operative in response to the initiation of a call on any one of said lines for transmitting pulses from said output channel to said input channel in the time position assigned to said one line, means included in said circuit for removing the signal sample modulation components from said last-named pulses, means for remodulating said last-named pulses with an all-links-busy signal, and means controlled by said line busying means for preventing said circuit from releasing pulses to said input channel during periods when the calling line is operatively associated with one of said links.

21. In an automatic telephone system, a plurality of lines having individually assigned thereto different nonoverlapping time positions which recur in repetitive time positions frames, a multiplexer provided with a common output channel and including means for sampling signals produced on said lines and for releasing pulses modulated with the signal samples to said output channel in the time positions respectively assigned to calling and called ones of said lines, a distributor provided with a common input channel and including means responsive to signal sample modulated pulses appearing on said input channel for distributing signal samples to said lines in the time positions individually assigned to said lines, a plurality of signal sample transmission links common to said lines, means including said links for receiving signal samples from said multiplexer output channel and transmitting signal samples to said distributor input channel, a line busying channel common to said lines, means for releasing pulses to said line busying channel in the time positions respectively assigned to said lines as said lines are taken into use, an all-links-busy circuit operative in response to the initiation of a call on any one of said lines for transmitting pulses from said output channel to said input channel in the time position assigned to said one line, means included in said circuit for removing the signal modulation components from said last-named pulses, means for remodulating said last-named pulses with an all-links-busy signal, and means included in said circuit and responsive to the pulses released to said line busying channel for preventing said circuit from releasing pulses to said input channel during periods when the calling line is operatively associated with one of said links.

22. In an automatic telephone system, a plurality of lines, a plurality of links common to said lines, means responsive to the initiation of a call on one of said lines during periods when at least one of said links is idle for transmitting an all-links-busy signal over the calling line, and means responsive to seizure of the calling line by an idle one of said links for discontinuing transmission of said all-links-busy signal over the calling line.

23. In an automatic telephone system, a plurality of lines, a plurality of links common to said lines, means responsive to the initiation of a call on one of said lines during periods when at least one of said links is idle for transmitting a supervisory tone signal over the calling line, and means responsive to the operative association of an idle one of said links with the calling line for removing said supervisory tone signal from the calling line.

24. In an automatic telephone system, a plurality of lines having individually assigned thereto different time positions in repetitive time position frames, a plurality of impulse responsive links, means independent of said links and responsive to the initiation of a call on one of said lines for developing pulses in the time position assigned thereto which are modulated with a supervisory tone signal, means for detecting said supervisory tone signal and transmitting the detected supervisory tone signal over the calling line, and means responsive to operative association of the calling line with an idle one of said links for terminating modulation of said pulses with said supervisory tone signal.

25. In an automatic telephone system, a plurality of lines having individually assigned thereto different time positions in repetitive time position frames, a plurality of impulse responsive links, means responsive to the initiation of a call on one of said lines for developing pulses in the time position assigned thereto which are modulated with an all-links-busy signal, means for detecting the all-links-busy signal modulated on said calling line pulses and transmitting the detected all-links-busy signal over the calling line, and means responsive to operative association of the calling line with an idle one of said links for terminating modulation of said calling line pulses with said all-links-busy signal.

26. In an automatic telephone system, a plurality of lines having individually assigned thereto different time positions in repetitive time position frames, a plurality of impulse responsive links, means including said links for selectively establishing two way connections between different pairs of said lines, means responsive to the initiation of a call on one of said lines during a period when all of said links are busy for developing pulses in the time position assigned to the calling line which are modulated with an all-links-busy signal, and means for detecting the all-links-busy signal modulated on said pulses and transmitting the detected all-links-busy signal over the calling line, thereby to inform the calling subscriber of the all-busy condition of said links.

27. In an automatic telephone system, a plurality of lines having individually assigned thereto different time positions in repetitive time position frames, switching apparatus including a plurality of impulse responsive links directively controllable in accordance with the time positions assigned to said lines for setting up telephonic connections between said lines, and means responsive to the initiation of a call on one of said lines during a period when all of said links are busy for transmitting an all-links-busy signal over said calling line.

28. In an automatic telephone system, a plurality of lines having individually assigned thereto different time positions which recur in repetitive time position frames, multiplexing means for sampling signals produced on said lines in the time positions individually assigned to said lines, distributing means for distributing signal samples in accordance with the time positions individually assigned to said lines, means including a plurality of impulse responsive links each directively controllable over any calling one of said lines for establishing telephonic connections between calling and called ones of said lines, and means responsive to the initiation of a call on one of said lines during a period when all of said links are busy for transmitting an all-links-busy signal over said calling line.

29. In an automatic telephone system, a plurality of lines having individually assigned thereto different time positions in repetitive time position frames, multiplexing means including a gate circuit for each of said lines and having a common output channel for all of said multiplexing gate circuits, distributing means including a gate circuit for each of said lines and having a common input channel for all of said distributing gate circuits, means including a plurality of impulse responsive links connected to said input and output channels for setting up telephonic connections between calling and called ones of said lines, means responsive to the initiation of a call on one of said lines during a period when all of said links are busy for transmitting pulses to said input channel in the time position assigned to said calling line, and means controlled by said last named pulses for transmitting an all-links-busy signal over said calling line.

30. In an automatic telephone system, a plurality of lines having individually assigned thereto different time positions in repetitive time position frames, common equipment including pulse generating means for repetitively producing synchronously related signal sampling pulses and signal sampling pulse gating pulses in said time positions, switching apparatus including a plurality of impulse responsive links and controlled by said signal sampling pulses and said signal sampling pulse gating pulses for setting up telephonic connections between said lines, and means responsive to the initiation of a call on one of said lines during a period when all of said links are busy for transmitting an all-links-busy signal over said calling line.

31. In an automatic telephone system, a plurality of lines having individually assigned thereto different time positions in repetitive time position frames, a plurality of impulse responsive links, means responsive to the initiation of a call on one of said lines for developing pulses in the time position assigned to said calling line, means controlled by said pulses for transmitting a supervisory tone signal to said calling line, and means responsive to operative association of said calling line with an idle one of said links for terminating transmission of said signal to said calling line.

References Cited in the file of this patent

UNITED STATES PATENTS

| | | |
|---|---|---|
| 2,416,131 | Voss | Feb. 18, 1947 |
| 2,512,676 | Ransom | June 27, 1950 |
| 2,553,605 | Ransom | May 22, 1951 |
| 2,694,750 | Trousdale | Nov. 16, 1954 |